United States Patent
Kang et al.

(10) Patent No.: US 11,126,712 B2
(45) Date of Patent: Sep. 21, 2021

(54) APPARATUS AND METHOD FOR PROTECTING ELECTRONIC DEVICE

(71) Applicant: Samsung Electronics Co., Ltd., Gyeonggi-do (KR)

(72) Inventors: Byoungik Kang, Seoul (KR); Minsoo Kim, Seoul (KR); Wonjin Kim, Gyeonggi-do (KR); Philkoo Yeo, Seoul (KR); Sangchul Jung, Gyeonggi-do (KR); Taedong Jung, Seoul (KR)

(73) Assignee: Samsung Electronics Co., Ltd

( * ) Notice: Subject to any disclaimer, the term of this patent is extended or adjusted under 35 U.S.C. 154(b) by 376 days.

(21) Appl. No.: 15/775,519

(22) PCT Filed: Oct. 31, 2016

(86) PCT No.: PCT/KR2016/012383
§ 371 (c)(1),
(2) Date: May 11, 2018

(87) PCT Pub. No.: WO2017/082567
PCT Pub. Date: May 18, 2017

(65) Prior Publication Data
US 2018/0357417 A1    Dec. 13, 2018

(30) Foreign Application Priority Data

Nov. 13, 2015  (KR) .................. 10-2015-0159962

(51) Int. Cl.
*G06F 11/00* (2006.01)
*G06F 12/14* (2006.01)
(Continued)

(52) U.S. Cl.
CPC .......... *G06F 21/554* (2013.01); *G06F 21/566* (2013.01); *G06F 21/70* (2013.01); *H04L 29/06* (2013.01); *G06F 2221/034* (2013.01)

(58) Field of Classification Search
CPC ...... G06F 21/554; G06F 21/566; G06F 21/70; G06F 21/55; H04L 29/06
(Continued)

(56) References Cited

U.S. PATENT DOCUMENTS

2004/0249858 A1* 12/2004 Nakagawa ............ G06F 3/0689
2007/0239751 A1  10/2007 Wei et al.
(Continued)

FOREIGN PATENT DOCUMENTS

| CN | 1965300 | 5/2007 |
|---|---|---|
| CN | 102034045 | 4/2011 |
| WO | WO 2008067335 | 6/2008 |

OTHER PUBLICATIONS

PCT/ISA/210 Search Report issued on PCT/KR2016/012383 (pp. 3).

(Continued)

*Primary Examiner* — Jeffrey C Pwu
*Assistant Examiner* — Samuel Ambaye
(74) *Attorney, Agent, or Firm* — The Farrell Law Firm, P.C.

(57) ABSTRACT

A method for operating an apparatus according to various embodiments may comprise the operations of: detecting whether a first signal transmitted from a control device to a storage device includes a designated address; and transmitting a second signal to the control device if the first signal includes the designated address, wherein the first signal may be a signal for transmitting, by the control device, a request for data to the storage device, and the second signal may be a signal for detecting whether uncommon data is included in a signal generated from the first signal.

18 Claims, 29 Drawing Sheets

(51) Int. Cl.
  *G06F 12/16* (2006.01)
  *G08B 23/00* (2006.01)
  *G06F 21/55* (2013.01)
  *H04L 29/06* (2006.01)
  *G06F 21/70* (2013.01)
  *G06F 21/56* (2013.01)

(58) Field of Classification Search
  USPC .................................................. 726/23
  See application file for complete search history.

(56) References Cited

U.S. PATENT DOCUMENTS

| | | | |
|---|---|---|---|
| 2008/0040565 A1 | 2/2008 | Rozas et al. | |
| 2008/0109620 A1* | 5/2008 | Nabekura | G06F 3/0647 |
| | | | 711/162 |
| 2013/0145439 A1* | 6/2013 | Lee | H04M 3/38 |
| | | | 726/5 |
| 2014/0359183 A1* | 12/2014 | Paek | G06F 13/24 |
| | | | 710/260 |
| 2015/0013002 A1 | 1/2015 | Smith et al. | |
| 2015/0220707 A1 | 8/2015 | Kline et al. | |
| 2015/0288720 A1 | 10/2015 | Touboul | |

OTHER PUBLICATIONS

PCT/ISA/237 Written Opinion issued on PCT/KR2016/012383 (pp. 6).
Christian Sarmoria et al., "Monitoring Access to Shared Memory-Mapped Files", Proceedings of The Digital Forensic Research Workshop, Aug. 19, 2005, 11 pages.
European Search Report dated Aug. 28, 2018 issued in counterpart application No. 16864493.8-1218, 9 pages.
European Search Report dated Apr. 9, 2020 issued in counterpart application No. 16864493.8-1218, 4 pages.
Indian Examination Report dated Feb. 23, 2021 issued in counterpart application No. 201837021708, 6 pages.
Chinese Office Action dated May 8, 2021 issued in counterpart application No. 201680066265.9, 18 pages.

* cited by examiner

APPARATUS AND METHOD FOR PROTECTING ELECTRONIC DEVICE

PRIORITY

This application is a National Phase Entry of PCT International Application No. PCT/KR2016/012383, which was filed on Oct. 31, 2016, and claims priority to Korean Patent Application No. 10-2015-0159962, which was filed on Nov. 13, 2015, the contents of each of which are incorporated herein by reference.

TECHNICAL FIELD

The following embodiments relate to protection of an electronic device.

BACKGROUND ART

With the recent growth of digital technologies, various types of electronic devices are being widely used such as mobile communication terminals, smart phones, tablet Personal Computers (PCs), Personal Digital Assistants (PDAs), electronic organizers, notebook computers, wearable devices, etc. The electronic devices are coming to a mobile convergence level encompassing even functions of other devices. The electronic devices can, for example, provide a call function such as a voice call, a video call, etc., a message transceiving function such as a Short Message Service (SMS)/Multimedia Message Service (MMS), an electronic mail (e-mail), etc., an electronic organizer function, a camera function, a broadcast play function, a video play function, a music play function, an Internet function, a messenger function, a game function, a Social Networking Service (SNS) function or the like.

DISCLOSURE OF INVENTION

Technical Problem

The following embodiments are to provide an apparatus and method for protecting an electronic device from an attack aiming at the electronic device.

Solution to Problem

An apparatus according to various embodiments may include a transmission and/or reception unit, and a control unit operatively coupled with the transmission and/or reception unit. The control unit is configured to detect whether a first signal transmitted from a control device to a storage device includes a designated address, and is configured to transmit a second signal to the control device if the first signal includes the designated address. The first signal may be a signal of transmitting, by the control device, a request for data to the storage device, and the second signal may be a signal for detecting whether uncommon data has been included in a signal generated from the first signal.

A method for operating an apparatus according to various embodiments may include detecting whether a first signal transmitted from a control device to a storage device includes a designated address, and transmitting a second signal to the control device if the first signal includes the designated address. The first signal may be a signal for transmitting, by the control device, a request for data to the storage device, and the second signal may be a signal for detecting whether uncommon data is included in a signal generated from the first signal.

Advantageous Effects of Invention

An apparatus according to various embodiments and an operation method thereof may protect an electronic device from various attacks.

BRIEF DESCRIPTION OF DRAWINGS

For more complete understanding of the disclosure, the following detailed description is made with reference to the accompanying drawings. In the drawings, the same reference numeral denotes the same constituent element.

BEST MODE FOR CARRYING OUT THE INVENTION

Figure 1:
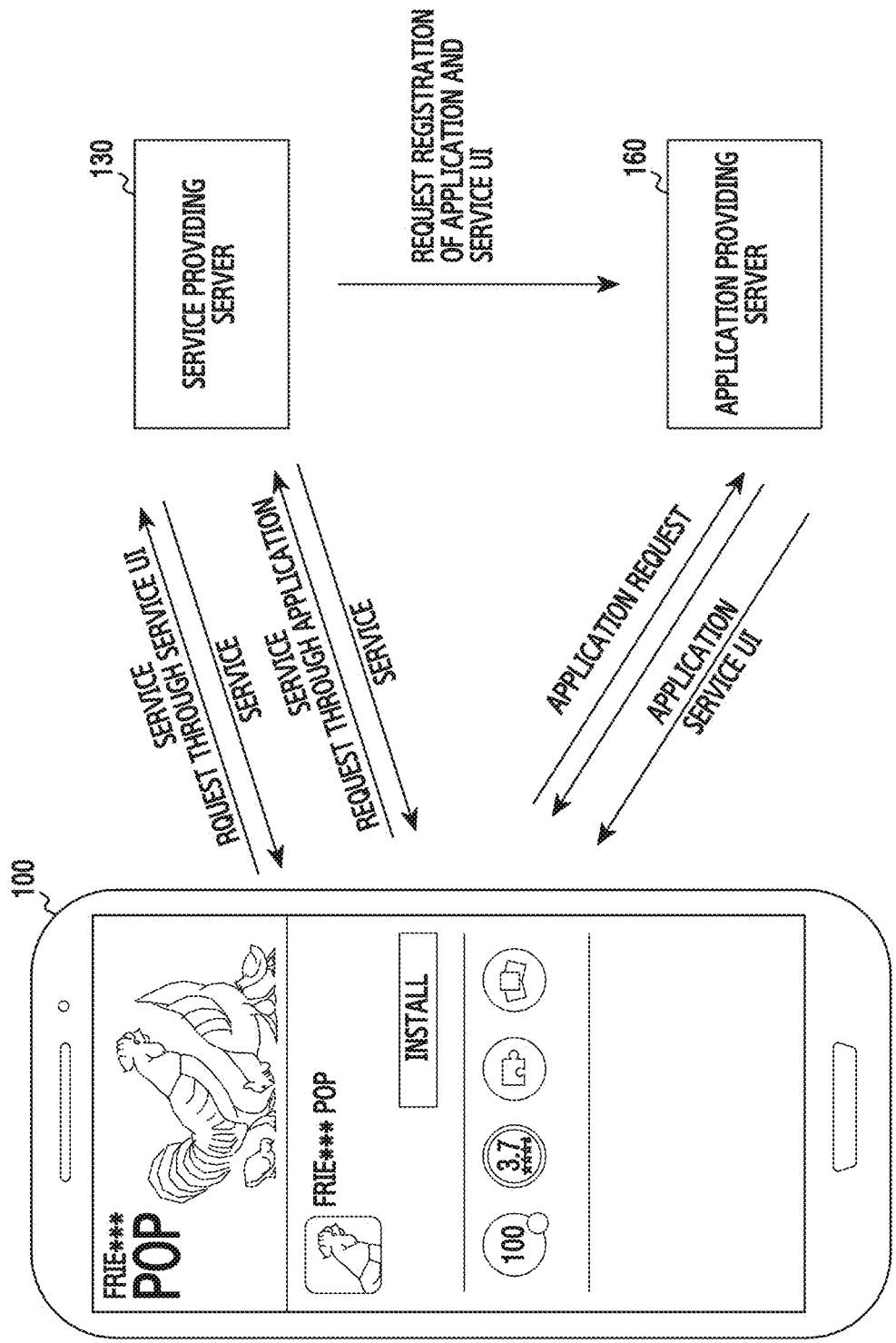
FIG. 1 illustrates an operation environment of an electronic device.

Various embodiments are mentioned below with reference to the accompanying drawings. However, it should be appreciated that these are not intended to limit the features set forth in the disclosure to particular embodiment forms and include various modifications, equivalents, and/or alternatives of an embodiment of the disclosure. With regard to the description of the drawings, similar reference numerals may be used to refer to similar elements.

The terms used in the disclosure are to just describe specific embodiments, and may not have an intention to limit the scope of other embodiments. The expression of a singular form may include the expression of a plural form unless otherwise dictating clearly in context. The terms used herein including the technological or scientific terms may have the same meanings as those generally understood by a person having ordinary skill in the art mentioned in the disclosure. Among the terms used in the disclosure, the terms defined in a general dictionary may be construed as having the same or similar meanings as the contextual meanings of a related technology, and are not construed as having ideal or excessively formal meanings unless defined clearly in the disclosure. According to cases, even the terms defined in the disclosure may not be construed as excluding embodiments of the disclosure.

The term denoting a hardware constituent element, the term denoting a signal/data transmitted and/or received between constituent elements, the term denoting a signal processing operation, etc., which are used in the following description, are exemplified for the sake of description convenience. The disclosure is not limited to the terms described later, and may use other terms having equivalent technological meanings.

An electronic device according to various embodiments may, for example, include at least one of a smart phone, a tablet Personal Computer (PC), a mobile phone, a video phone, an electronic book (e-book) reader, a desktop PC, a laptop PC, a netbook computer, a workstation, a server, a Personal Digital Assistant (PDA), a Portable Multimedia Player (PMP), a Moving Picture Experts Group (MPEG-1 or MPEG-2) Audio Layer 3 (MP3) player, a mobile medical instrument, a camera, or a wearable device. According to various embodiments, the wearable device may include at least one of an accessory type (e.g., a watch, a ring, a wristlet, an anklet, a necklace, glasses, a contact lens, or a head-mounted-device (HMD), etc.), a fabric or clothing integrated type (e.g., electronic clothes), a body mount type (e.g., a skin pad or tattoo), or a bio-physical implantation type (e.g., an implantable circuit).

In various embodiments of the disclosure described below, a hardware access method is explained as an example. However, the various embodiments of the disclosure include a technology that uses all of hardware and software and therefore, the various embodiments of the disclosure do not exclude a software based access method.

With the development of communication technologies, a communication function is embedded in various embedded systems such as home appliance, a mobile device, a wearable computer, etc. Accordingly to this, various electronic devices or embedded systems having the communication function may be vulnerable to the protection of private information, the protection of financial information, etc. For example, a user of a smart phone may be robbed of private information within the smart phone, and a user of the home appliance mounting the communication function may be exposed to a denial of service attack (DDoS) attack on an upper network, and a home installing an Internet of Things (IoT) illuminator may be exposed to an illuminance ON/OFF control attack.

A method for defending from several hackings into an electronic device may be divided into a method that uses a hardware security technology and a method that uses a software security technology. Hacking may be a term involving all operations of invading into the electronic device without user's permission, to extract or damage data. Hacking may be a term involving all operations of enabling the electronic device to operate differently from a user's intention. Hacking may be a term involving all operations of enabling the electronic device to perform a non-designated operation.

A security technology that uses software may generally record information about a system call, and analyze the record, to maintain security. The system call may be a signal generated by an application. The system call may be forwarded to several constituent elements within the electronic device through an operating system (OS) installed in the electronic device. The security technology that uses software may have a problem that a sensed object is limited to the system call. Also, the security technology that uses software may have a problem that the sensed object is limited to the application.

A security technology that uses hardware may generally monitor a memory traffic occurring by using a security device connected to a processing device and a storage device, to maintain security. The security technology that uses hardware may have a problem that hacking may be sensed after hacking occurrence. The security technology that uses hardware may have a problem of not being capable of flexibly extending a sensed region. The security technology that uses hardware may have a problem that the sensed object may be restricted to an OS.

An apparatus according to various embodiments may predict hacking. The apparatus may real-time sense hacking into the electronic device through hardware. The apparatus may sense various attacks on the electronic device through flexible management. The apparatus may cope with hacking into the electronic device including the apparatus, without deterioration of performance. The apparatus may sense not only hacking into an OS region but also hacking into an application region.

The apparatus may predict hacking into the electronic device. The apparatus may analyze a read signal, to predict hacking. The read signal may include data that a control device requests to a storage device. The read signal may be transmitted from the storage device to the control device. The apparatus may analyze a series of instruction information included in the read signal, to predict hacking before hacking occurrence. For example, the apparatus may detect a read signal which is suspected of being related with hacking or is identified as hacking occurrence being easy. The apparatus may trace the read signal, to predict hacking into the electronic device.

The apparatus may predict hacking into the electronic device. The apparatus may analyze signals within the electronic device, to detect not only hacking into an OS region but also hacking into an application region. For example, the apparatus may analyze a write signal, to predict hacking. The write signal may include data which the control device desires to record in the storage device. The write signal may be transmitted from the control device to the storage device. The apparatus may analyze a write signal for a memory region that is being used in an OS, to detect hacking into the OS region in real time. For another example, the apparatus may analyze transmission and/or reception information and application information between the control device and hardware devices, to detect hacking. The hardware devices may be devices which directly or indirectly communicate with the control device. The hardware devices may be devices which the control device may control operations. The hardware device may be a communication device (for example, a network interface card (NIC), a Wi-Fi module, etc.), a storage device (for example, a dynamic random access memory (DRAM), a secure digital (SD) card, etc.), a sensor device (for example, a global positioning system (GPS), a gyroscope, etc.), an input output device (for example, a display, a keyboard, a touch pad, a touch screen, etc.), etc. If communication or control, for a hardware device not granted for access in an application that is running, occurs, the apparatus may identify this as hacking, to sense a hacking attack in real time. The apparatus may identify a correlation between accessible hardware devices, to sense hacking. If a plurality of hardware devices which have no correlation or must not be used together are used simultaneously, or if it is intended to use the hardware device despite conditions that the hardware device must not be used, the apparatus may identify this as hacking, to sense a hacking attack.

The apparatus may provide a method of coping with the detected hacking. If hacking is detected, the apparatus may identify a method of coping with hacking. The coping method may include a method of coping with by controlling hardware. The coping method may include a method of coping with by controlling an application related with the hacking attack. For example, the apparatus may intercept the transmission of an instruction, data, or a signal related with the detected hacking. For another example, the apparatus may discard the instruction, data, or signal related with the detected hacking. For further example, the apparatus may display the occurrence of hacking on an output device (for example, a display device), wherein a user may recognize hacking.

FIG. 1 illustrates an operation environment of an electronic device.

Referring to FIG. 1, the electronic device 100 may communicate with a service providing server 130, an application providing server 160, etc. through a wired or wireless path.

The electronic device 100 may be any mobile system such as a mobile phone, a smart phone, a personal digital assistant (PDA), a portable multimedia player (PMP), a digital camera, a music player, a portable game console, a navigation system, a laptop computer, etc. Also, the electronic device 100 may be a fixed system such as a non-mobile device supporting machine type communication (MIC), a personal computer (PC), etc.

The electronic device 100 may communicate with the application providing server 160 in order to receive an application or a service user interface (UI). For example, the electronic device 100 may request an application to the application providing server 160. In response to the request for the application, the application providing server 160 may provide the application or the service UI to the electronic device 100.

The electronic device 100 may communicate with the service providing server 130 in order to receive a service. For example, the electronic device 100 may request a service to the service providing server 130 through the service UI installed in the electronic device 100. In response to the request for the service, the service providing server 130 may provide the service to the electronic device 100. For another example, the electronic device 100 may request a service to the service providing server 130 through an application installed in the electronic device 100. In response to the request for the service, the service providing server 130 may provide the service to the electronic device 100.

As in an example illustrated in FIG. 1, the electronic device 100 may include a communication function. The electronic device 100 having the communication function may provide a convenience to a user. However, the electronic device 100 having the communication function may be easily exposed to various kinds of hacking attacks.

Figure 2:
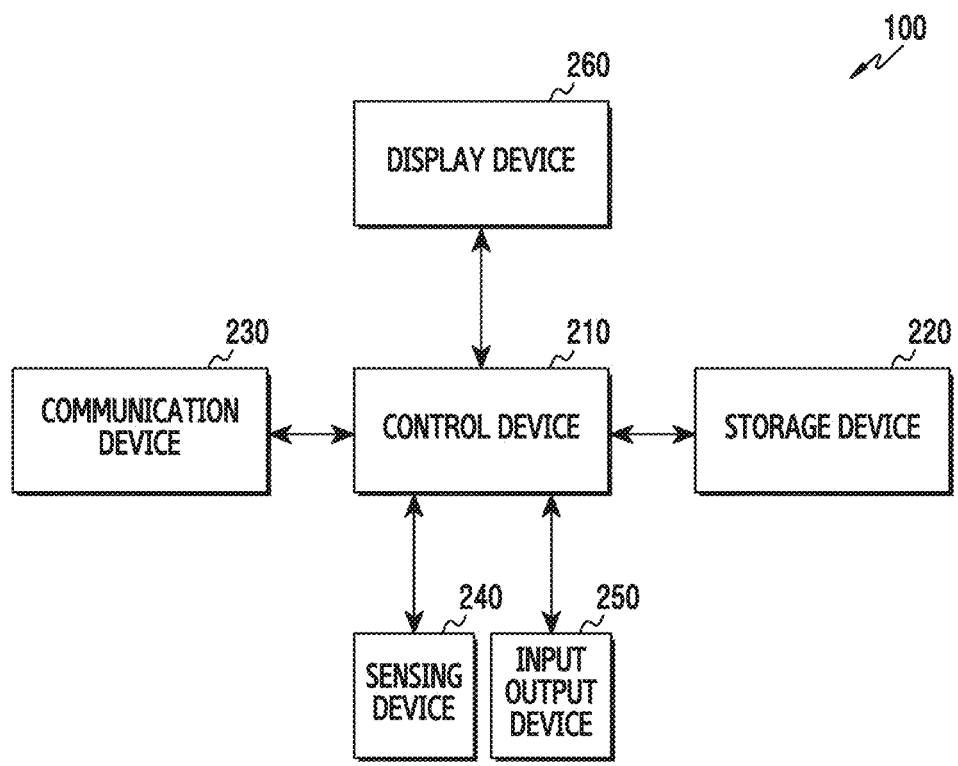
FIG. 2 illustrates a functional block construction of an electronic device performing various functions.

FIG. 2 illustrates a functional block construction of an electronic device performing various functions. The block construction exemplified in FIG. 2 may be included in the electronic device 100 illustrated in FIG. 1.

Referring to FIG. 2, the electronic device 100 may include a control device 210, a storage device 220, a communication device 230, a sensing device 240, an input output device 250, and a display device 260.

The control device 210 may control general operations of the electronic device 100. The electronic device 100 may run an application of providing an Internet browser, a game, a video, etc. In accordance with an embodiment, the control device 210 may include a single core or include a multi-core. For example, the control device 210 may include the multi-core such as a dual-core, a quad-core, a hexa-core, etc. In accordance with an embodiment, the control device 210 may further include a cache memory that is located inside or outside.

The storage device 220 may store a control instruction code controlling the electronic device 210, control data, or user data. The storage device 220 may include at least one of a volatile memory or a non-volatile memory. The non-volatile memory may include a read only memory (ROM), a programmable ROM (PROM), an electrically programmable ROM (EPROM), an electrically erasable PROM (EEPROM), a flash memory, a phase-change RAM (PRAM), a magnetic RAM (MRAM), a resistive RAM (RRAM), a ferroelectric RAM (FRAM), etc. The volatile memory may include at least one of various memories such as a dynamic RAM (DRAM), a static RAM (SRAM), a synchronous DRAM (SDRAM), a phase-change RAM (PRAM), a magnetic RAM (MRAM), a resistive RAM (RRAM), a ferroelectric RAM (FRAM), etc.

The storage device 220 may include a non-volatile media such as a hard disk drive (HDD), a solid state disk (SSD), an embedded multimedia Card (eMMC), and a universal flash storage (UFS). The storage device 220 may store user's information provided through the input output device 250 and sensing information collected through the sensing device 240.

The communication device 230 may include a transmitter and/or a receiver. Through the transmitter and/or receiver, the electronic device 100 may receive information from other devices (for example, a gateway, an access point, a base station, a terminal, etc.). Through the transmitter and/or receiver, the electronic device 100 may transmit information to the other devices.

The sensing device 240 may be a sensor that senses external information. For example, the sensing device 240 may be an image sensor. The sensing device 240 may be connected with the control device 210, to transmit generated image information to the control device 210. For another example, the sensing device 240 may be a bio sensor that senses biometric information. The sensing device 240 may sense a fingerprint, an iris pattern, a heart rate, a blood sugar, etc., and generate sensing data corresponding to the sensed information, to provide the sensing data to the control device 210. The sensing device 240 may be any sensor such as a camera, an illuminance sensor, a sound sensor, an acceleration sensor, etc. as well as the above example.

The input output device 250 may include an input means such as a touch pad, a keypad, an input button, etc., and an output means such as a speaker, etc. The input output device 250 may sense an input of the electronic device 100. The input output device 250 may sense a touch or hovering input of the finger and a pen.

The display device 260 may display an image signal which is processed by the control device 210. The display device 260 may display a capture or still image, and may display a video or camera preview image. The display device 260 may be a liquid crystal display (LCD) or an organic light emitting diode (OLED).

The input output device 250 and the display device 260 may be configured as an integral touch screen as well.

Figure 3:
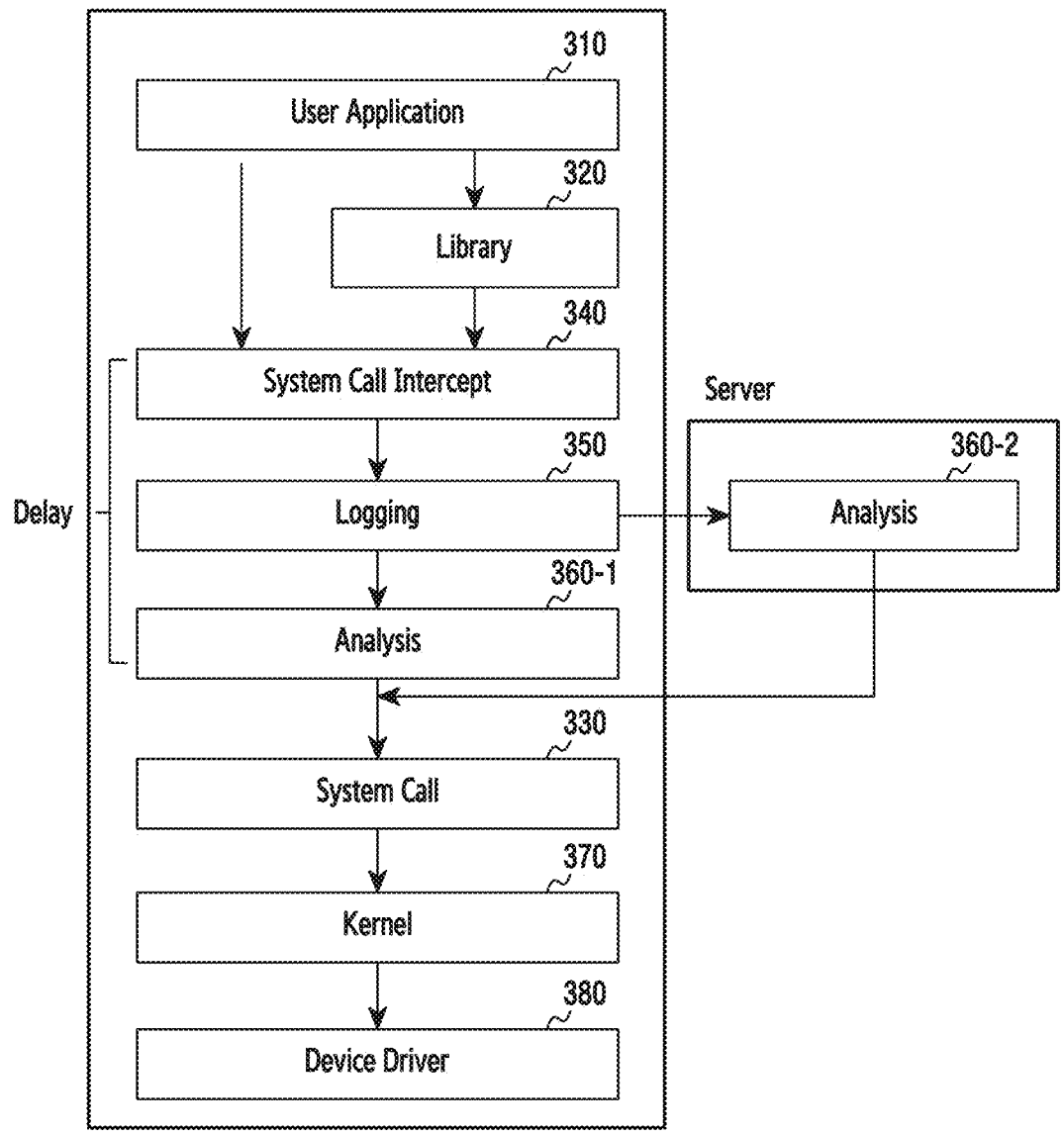
FIG. 3 illustrates a structure of a security technology that uses software.

FIG. 3 illustrates a structure of a security technology that uses software. The structure exemplified in FIG. 3 may be performed by the electronic device 100 illustrated in FIG. 1.

Referring to FIG. 3, in step 310, a user may run a user application installed in the electronic device 100. According to the control of the user, the user application may generate a system call. According to an embodiment, as in step 320, the user application may generate the system call through a library. The library may include control information, an instruction, data, etc. for the user application. If the electronic device 100 does not use the security technology that uses software, in step 330, the electronic device 100 may activate the system call.

In step 340, the electronic device 100 may temporarily intercept the system call for the purpose of applying the security technology that uses software. In step 350, the electronic device 100 may log the intercepted system call for the purpose of applying the security technology. In step 360-1, the electronic device 100 may analyze whether data, etc. related with hacking is included in the logged system call. The analyzing of the logged system call may be performed within the electronic device 100. According to an embodiment, in step 360-2, the analyzing of the logged system call may be performed at the outside (for example, a server, etc.) of the electronic device 100. The system call may be analyzed by the electronic device 100 as in step 360-1, or be analyzed by the server as in step 360-2.

In step 330, if the data related with hacking is not detected in the logged system call, the electronic device 100 may perform an operation for processing of the system call.

In step 370, the system call may be forwarded through a kernel. The kernel may mean a region of an OS installed in the electronic device 100.

In step 380, the system call may be provided to a device driver, etc. The device driver may perform operations corresponding to the system call.

As illustrated in FIG. 3, the security technology that uses software may include an operation of intercepting the system call such as step 340, an operation of logging such as step 350, and/or an operation of analysis such as step 360. The security technology that uses software including these operations may deteriorate the performance of an application, etc. Also, the security technology that uses software including these operations may deteriorate a running speed of the application. Also, the security technology that uses software may have a problem that a sensed object may be restricted to the application.

Figure 4:
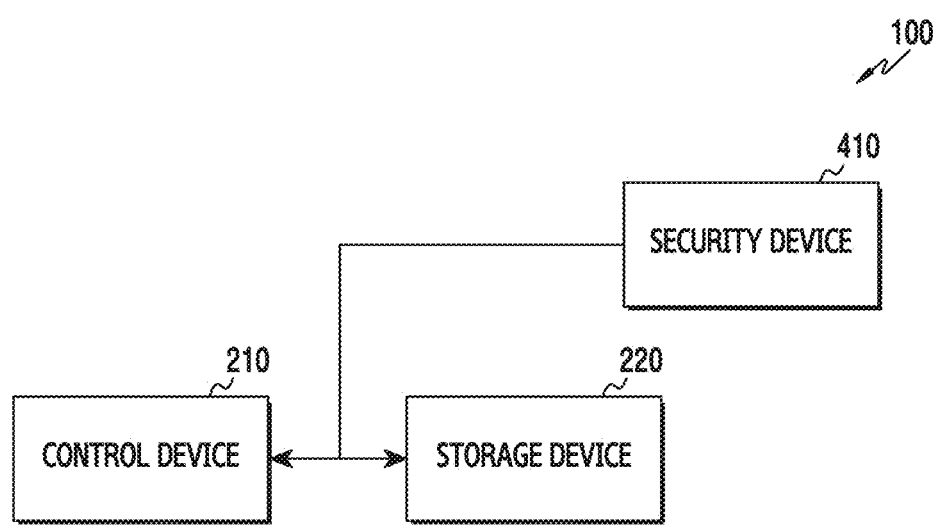
FIG. 4 illustrates a structure of a security technology that uses hardware.

FIG. 4 illustrates a structure of a security technology that uses hardware. The structure exemplified in FIG. 4 may be performed by the electronic device 100 illustrated in FIG. 1.

Referring to FIG. 4, the electronic device performing the security technology that uses hardware may include a security device 410. The security device 410 may monitor a signal between the control device 210 and the storage device 220 illustrated in FIG. 2. The security device 410 may analyze the monitored signal.

Unlike the security technology that uses software exemplified in FIG. 3, the security technology that uses hardware may not perform an operation of intercepting a system call, an operation of logging, and/or an operation of analyzing. In this aspect, the security technology that uses hardware may not provide the deterioration of performance of an application, the deterioration of a running speed of the application, etc. However, the security technology that uses hardware may limit a sensed object to an OS region. Also, the security technology that uses hardware may not extend the sensed object flexibly. Also, the security technology that uses hardware may make possible only posterior measures after hacking occurrence.

Unlike the electronic device applying the security technologies exemplified in FIG. 3 and FIG. 4, an apparatus according to various embodiments may protect the electronic device, without causing the deterioration of performance. Also, the apparatus may predict hacking before hacking occurs. Also, the apparatus may perform monitoring of an application region as well as an OS region, to extend a hacking sensing region. Also, the apparatus may cope with various kinds of hackings flexibly.

Figure 5:
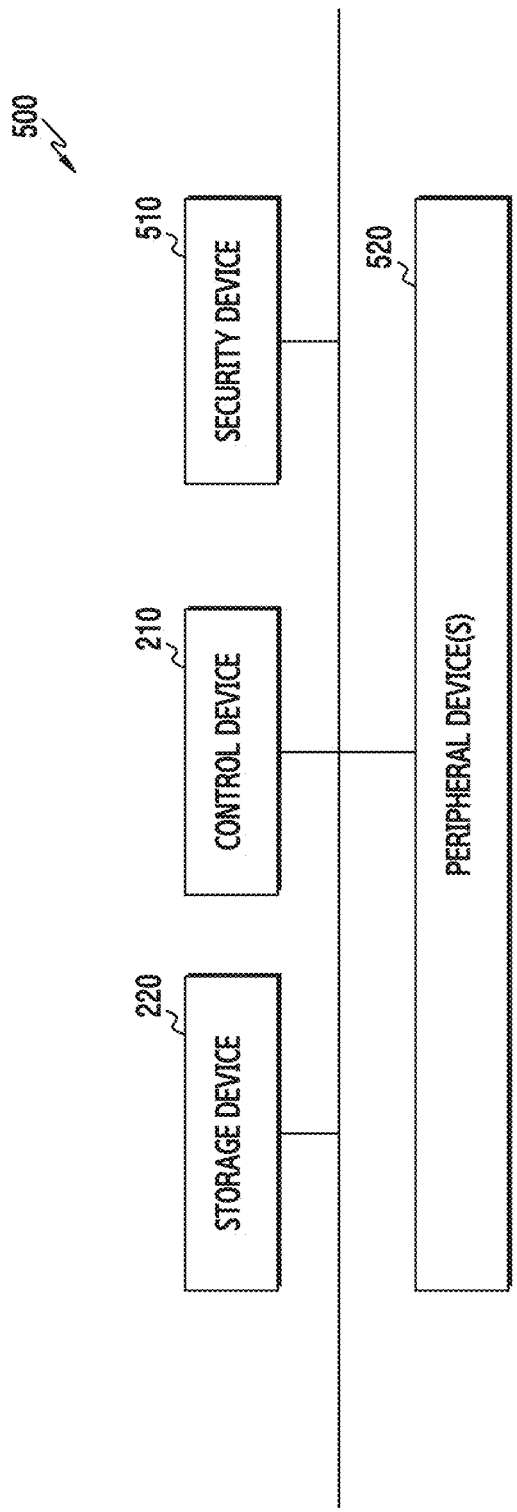
FIG. 5 illustrates a functional block construction of an electronic device according to various embodiments.

FIG. 5 illustrates a functional block construction of an electronic device according to various embodiments. As used herein, the term "device" may mean the unit of processing at least one function or operation. The term "device" may be implemented as hardware, software, or a combination of hardware and software. In response to being implemented as hardware, the term "device" may be denoted as a "circuitry".

Referring to FIG. 5, the electronic device 500 may include the control device 210 illustrated in FIG. 2, the storage device 220, a security device 510, and/or a peripheral device(s) 520. The peripheral device 520 may include the communication device 230, the sensing device 240, the input output device 250, the display device 260, etc. exemplified in FIG. 2. The control device 210, the storage device 220, the peripheral device 520 (for example, the communication device 230, the sensing device 240, the input output device 250, and/or the display device 260), etc. may perform the functions exemplified in FIG. 2. Also, the control device 210, the storage device 220, and/or the peripheral device 520 (for example, the communication device 230, the sensing device 240, the input output device 250, the display device 260, etc.) may be implemented in schemes exemplified in FIG. 2.

Other constituent elements (for example, the storage device 220, the peripheral device 520, etc.) of the electronic device 500 may generate various kinds of signals. For example, the signal may be a request signal, and may be a response signal. The signal may include an address. The address may indicate a subject (for example, a constituent element of the electronic device 500) of generating a signal. The address may indicate a subject of receiving a signal.

The control device 210 may perform control for an OS and/or application installed in the electronic device 500. For example, the control device 210 may control other constituent elements of the electronic device 100 according to a system call generated from the OS and/or application.

The control device 210 may run the OS and/or application. For example, the control device 210 may run the OS and/or application, based on a signal or data received from the sensing device 240 or the input output device 250.

The control device 210 may process data or a signal which is generated by the OS and/or the application. For example, the control device 210 may request the data or signal to the storage device 220 for the sake of the OS or the application. The control device 210 may record (or store) or update the data or signal in the storage device 220 for the sake of the OS or the application.

The storage device 220 may store data, an instruction, etc. for other constituent elements of the electronic device 500. The storage device 220 may store data, an instruction, etc. for a program and/or module installed in the electronic device 500. For example, the storage device 220 may store data, an instruction, etc. for an OS and/or application installed in the electronic device 500.

The storage device 220 may receive a request signal from other constituent elements of the electronic device 500.

The request signal may be a signal of requesting to provide data or an instruction stored in the storage device 220. For example, if the control device 210 requests data to the storage device 220, the storage device 220 may provide a read signal to the control device 210. The read signal may be a signal including data requested by the control device 210.

The request signal may be a signal of requesting to update data or an instruction stored in the storage device 220. The request signal may be a signal of providing data or an instruction intended to be stored in the storage device 220. For example, the storage device 220 may receive a write signal from the control device 210. The write signal may include data that the control device 210 intends to store in the storage device 220. The write signal may include an address on the storage device 220 that will store the data. The write signal may be a combination of a signal of forwarding the data and a signal of forwarding the address. The write signal may be a form of a data unit, which includes a payload including data and control information including an address.

The display device 260 may display a message of warning that hacking has occurred in the electronic device 500. For example, the display device 260 may display a warning message, based on a signal received from the control device or the security device 510.

The communication device 230, the sensing device 240, the input output device 250, and/or the display device 260 may be denoted as the peripheral device 520.

The security device 510 may sense hacking into the electronic device 500. For example, the security device 510 may detect a signal or data related with hacking into the electronic device 500.

The security device 510 may predict hacking into the electronic device 500. For example, the security device 510 may specify a signal or data vulnerable to hacking, among a signal or data generated and changed in the electronic device 500. If the signal or data vulnerable to hacking is activated, the security device 510 may generate a tag signal for tracing the signal or data. If the signal or data vulnerable to hacking is activated, the security device 510 may insert a tag to the signal or data as well. The security device 510 may predict hacking occurrence or non-occurrence through the generated tag or tag signal.

The security device 510 may provide a method of coping with hacking which occurs in the electronic device 500. For example, if hacking has occurred in the electronic device 500, the security device 510 may intercept data or a signal related with hacking, to cope with hacking. For another example, the security device 510 may eliminate the data or signal related with hacking, to cope with hacking. For further example, the security device 510 may display a warning message which includes information about the data or signal related with hacking, on the display device 260.

The security device 510 may include a signal detecting unit, an address translating unit, a signal providing unit, a data recording unit, and/or a temporary storage unit.

Figure 6:
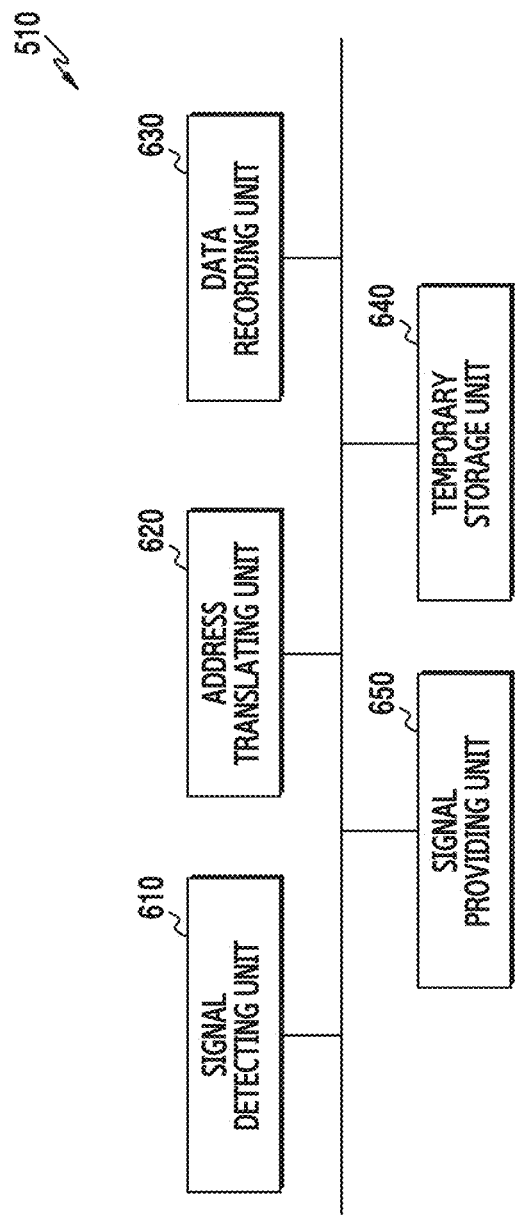
FIG. 6 illustrates a functional block construction of a security device according to various embodiments.

FIG. 6 illustrates a functional block construction of a security device according to various embodiments. This block construction may be included in the security device 510 illustrated in FIG. 5.

Referring to FIG. 6, the security device 510 may include a signal detecting unit 610, an address translating unit 620, a data recording unit 630, a temporary storage unit 640, and/or a signal providing unit 650.

The signal detecting unit 610 may detect a read request signal vulnerable to hacking, among read request signals transmitted from the control device 210 to the storage device 220. The signal detecting unit 610 may detect a read request signal vulnerable to hacking, based on an address and/or data included in the read request signal. For example, if the address included in the read request signal indicates the communication device 230, the input output device 250, etc., the signal detecting unit 610 may detect the read request signal as a read request signal vulnerable to hacking. For another example, if data requested by the read request signal includes the substance of private information or financial information, the signal detecting unit 610 may detect the read request signal as a read request signal vulnerable to hacking. The signal detecting unit 610 may compare a designated address and an address included in a received read request signal, to detect a read request signal vulnerable to hacking. Through this detecting of the read request signal, an apparatus according to various embodiments may predict hacking.

The signal detecting unit 610 may detect a write signal related with hacking, among write signals provided to the storage device. For example, the signal detecting unit 610 may detect a write signal related with hacking, based on an address and/or data included in the write signal. If the write signal includes an address of an immutable region, the signal detecting unit 610 may detect the write signal as a write signal related with hacking. The immutable region may be a region which is write-prohibited permanently, semi-permanently, or temporarily. The immutable region may be defined previously at manufacturing of the electronic device 500, or be defined by an OS. For example, the immutable region may be one of a code region of the OS, a system call table, and an interrupt descriptor table. Through this detecting of the write signal, an apparatus according to various embodiments may detect hacking.

The signal detecting unit 610 may detect a signal related with hacking, based on a record about a write signal. Assume that a data structure of a first write signal recorded in the data recording unit 630, etc. is comprised of data A, data B, and/or data C. If this data structure of the first write signal is changed into the data A, the data B, data D, and/or the data C, the signal detecting unit 610 may recognize updating of these data (adding of the data D). The added data D may be data caused by updating of an application, but may be data caused by hacking as well. The signal detecting unit 610 may trace the data A to the data D. If the data D is not actually used, the signal detecting unit 610 may detect the data D, a signal related with the data D, or the first write signal, as a signal related with hacking. Through this detecting, an apparatus according to various embodiments may detect hacking.

The signal detecting unit 610 may detect a signal or data related with hacking, based on a signal including data for activating the peripheral device 520, etc. If a signal for activating the peripheral device 520, etc. includes data of activating the peripheral device 520 not related with an application corresponding to the signal, the signal detecting unit 610 may detect the signal as the signal related with hacking. Whether the application and the peripheral device 520 are related with each other may be set by a user's authentication or a designated procedure in an application installation process. Whether the application and the peripheral device 520 are related with each other may be set by a user's authentication or a designated procedure in an application updating process. For example, assume that an application corresponding to a signal A uses the input output device 250 and the display device 260. If the signal A includes data for activating the communication device 230 or the sensing device 240, the signal detecting unit 610 may detect the signal A as a signal related with hacking.

The signal detecting unit 610 may detect a signal related with hacking, based on information, data, or signal which is accompanied by a flag. The flag may be a mark for protecting the data or signal from hacking. The signal providing unit 650 may perform continuous monitoring for the signal accompanied by the flag. If the signal accompanied by the flag does not perform a scenario operation of an application or is exposed to a range beyond authority, the signal providing unit 650 may identify that hacking has occurred, and detect signals related with hacking.

The address translating unit 620 may translate an address included in a signal related with hacking. If the signal related with hacking is stored in the storage device 220, etc., the electronic device 500 may be damaged due to hacking. The address translating unit 620 may translate an address included in a signal identified to be related with hacking, to intercept transmission to the storage device 220. For example, if it is detected that a write signal includes an address of an immutable region, the address translating unit 620 may translate the address included in the detected write signal into an address of the temporary storage unit 640. Through this address translation, an apparatus according to various embodiments may prevent a damage of hacking.

The data recording unit 630 may record an operation of a write signal. The data recording unit 630 may group an operation of a write signal, based on an address and data included in the write signal. The data recording unit 630 may group and record the operation of the write signal through data pattern matching.

The temporary storage unit 640 may store a signal including an address translated by the address translating unit 620. The translated address may be an address of the temporary storage unit 640. The temporary storage unit 640 may store a signal related with hacking, to prevent the signal related with hacking from being leaked inside or outside the electronic device 500.

The temporary storage unit 640 may be separated and configured in the security device 510. For example, the temporary storage unit 640 may be an independent constituent element of the electronic device 500, or may be included in the storage device 220. Also, the temporary storage unit 640 may be omitted according to implementation as well.

The signal providing unit 650 may generate a signal for tracing a signal vulnerable to hacking or a signal related with hacking. If the signal vulnerable to hacking is detected through the signal detecting unit 610, the signal providing unit 650 may generate an independent tag signal for the sake of continuous monitoring. According to an embodiment, the signal providing unit 650 may attach a tag to the signal vulnerable to hacking, for the sake of continuous monitoring. An apparatus according to various embodiments may predict hacking through the tag or the tag signal.

The signal providing unit 650 may attach a flag to information, data, or signal needing security. For example, the signal providing unit 650 may attach a flag to data or signal which includes private information, financial information, etc. An apparatus according to various embodiments may sense hacking through the signal accompanied by the flag.

In response to a signal related with hacking being received, the signal providing unit 650 may convert the received signal, to generate a signal which includes null data. Through the generating of the signal including the null data, the signal providing unit 650 may prevent a signal related with hacking from being transmitted to the electronic device 500. For example, if a signal including data for leaking financial information is received through the communication device 230 of the electronic device 500, the signal providing unit 650 may convert the received signal, to generate a signal including null data.

The signal providing unit 650 may generate a signal for coping with hacking. For example, in response to a signal related with hacking being detected through the signal detecting unit 610, the signal providing unit 650 may generate a signal for a warning message. The signal for the warning message may be forwarded directly to the display device 260 illustrated in FIG. 5, or be forwarded to the display device 260 through the control device 210. The display device 260 having received the signal for the warning message may display the warning message.

Though not illustrated in FIG. 6, the security device 510 may include a transmission and/or reception unit which communicates with constituent elements of the electronic device 500. The security device 510 may receive, through the transmission and/or reception unit, a signal or data from the constituent elements of the electronic device 500. The security device 510 may transmit, through the transmission and/or reception unit, a signal or data to the constituent elements of the electronic device 500.

The signal detecting unit 610, the address translating unit 620, the data recording unit 630, and the signal providing unit 650 may be denoted as a control unit as well. The security device 510 according to various embodiments may be comprised of the control unit and the transmission and/or reception unit.

Figure 7:
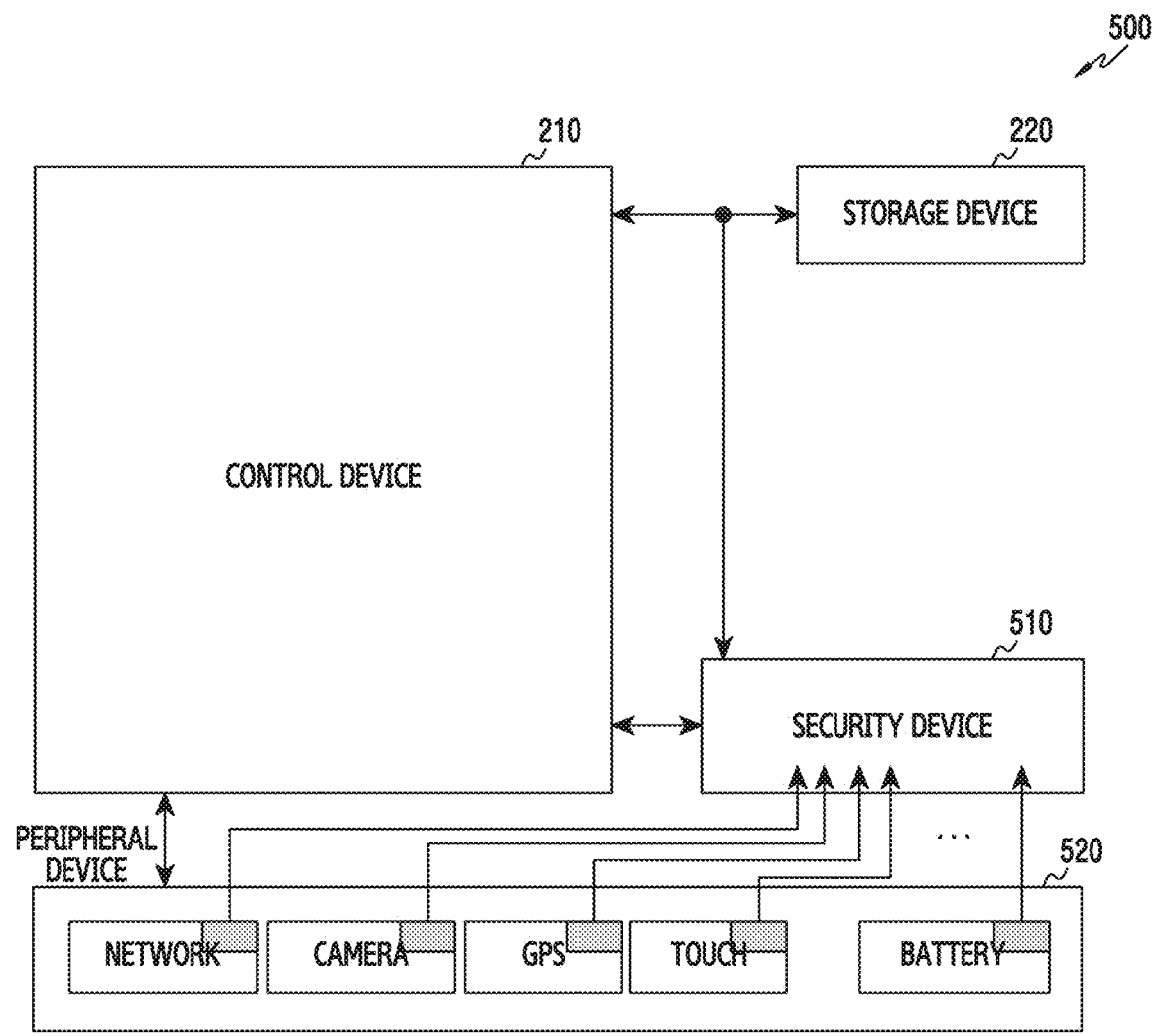
FIG. 7 illustrates a hardware construction of an electronic device according to various embodiments.

FIG. 7 illustrates a hardware construction of an electronic device according to various embodiments. The hardware construction exemplified in FIG. 7 may be included in the electronic device 500 illustrated in FIG. 5.

Referring to FIG. 7, the electronic device 500 may include the control device 210, the storage device 220, the security device 510, and/or the peripheral device 520 illustrated in FIG. 5.

The security device 510 may be operatively coupled to a transmission path between the control device 210 and the storage device 220. For the sake of application execution, control or the like, the control device 210 may exchange a signal with the storage device 220. The signal may be a write signal or a read signal. The security device 510 may monitor a transmission path between the control device 210 and the storage device 220, to detect a signal vulnerable to hacking or a signal related with hacking.

The security device 510 may be operatively coupled with the control device 210. The security device 510 may receive a reference signal or reference data necessary for security, from the control device 210. For example, the security device 510 may detect a signal vulnerable to hacking or a signal related with hacking, based on the reference signal received from the control device 210.

The security device 510 may be operatively coupled with the peripheral device 520. The security device 510 may detect a signal vulnerable to hacking or a signal related with hacking, based on a signal generated from the peripheral device 520 (for example, a signal, etc. activating the peripheral device 520). For example, in response to a signal not related with a GPS activating the GPS, the security device 510 may detect the signal, as a signal vulnerable to hacking or a signal related with hacking.

Figure 8:
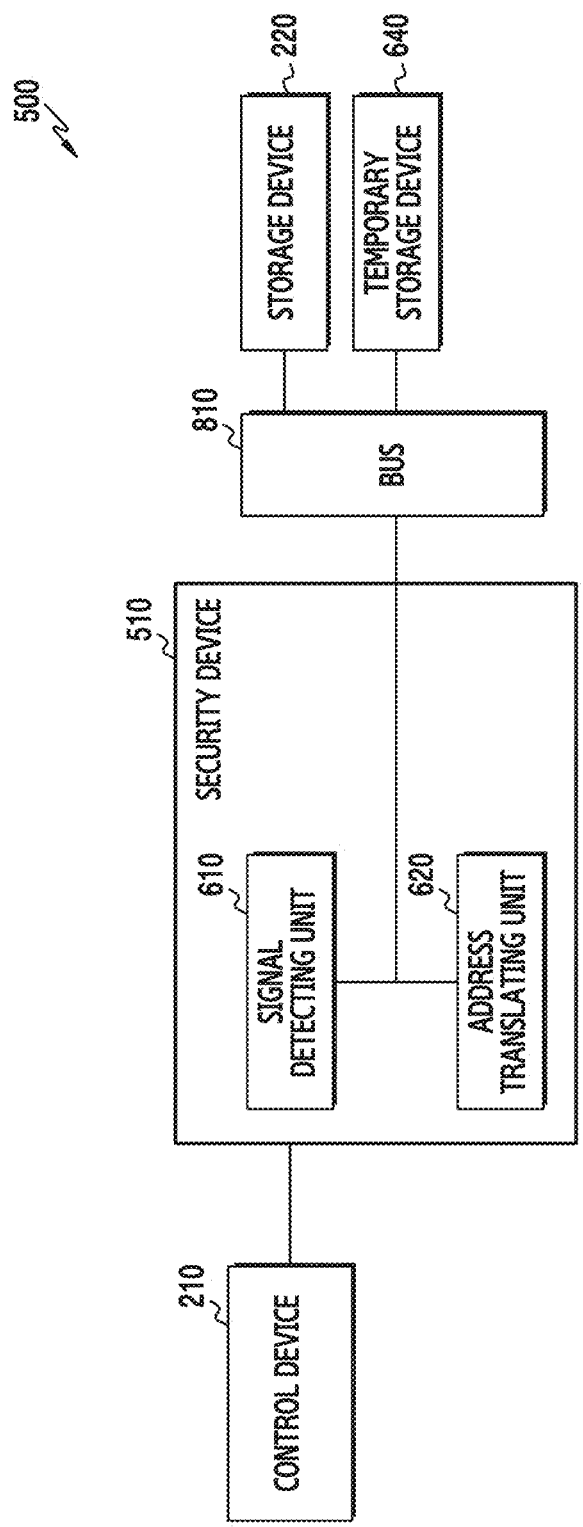
FIG. 8 illustrates a hardware construction of an electronic device sensing hacking through a signal according to various embodiments.

FIG. 8 illustrates a hardware construction of an electronic device sensing hacking through a signal according to various embodiments. This hardware construction may be included in the electronic device 500 illustrated in FIG. 5.

Referring to FIG. 8, the electronic device 500 may include the control device 210, the storage device 220, the security device 510, the temporary storage unit 640, and/or a bus 810. The security device 510 may include the signal detecting unit 610 and/or the address translating unit 620 illustrated in FIG. 6.

The bus 810 may be a device for operatively coupling the security device 510, the storage device 230, and/or the temporary storage unit 640. The bus 810 may provide a signal to other devices, based on an address included in the signal.

The control device 210 may transmit a write signal in order to store data in the storage device 220. The write signal may include the data, and an address that will store the data. The write signal may be received to the security device 510, before being received to the storage device 220. The signal detecting unit 610 may detect an address included in the write signal. The detected address may include an address of an immutable region. Because the immutable region may be a region not controlled by a user, the signal detecting unit 610 may detect the write signal as a signal related with hacking. The signal detecting unit 610 may forward that the write signal may be related with hacking, to the address translating unit 620.

The address translating unit 620 may translate the address included in the write signal. To prevent a damage of hacking, the address translating unit 620 may translate the address included in the write signal, from an address of the storage device 220 to an address of the temporary storage unit 640 illustrated in FIG. 6.

If it is identified that a write signal is a signal related with hacking, the temporary storage unit 640 may temporarily store the write signal. The temporary storage unit 640 may be denoted as dummy as well. If the write signal address-translated by the address translating unit 620 is a signal not related with hacking (for example, if it is a signal of a type newly generated through updating, etc.), the signal stored in the temporary storage unit 640 may be restored. For example, if the signal stored in the temporary storage unit 640 is not a signal related with hacking, the security device 510 may enable to store the stored signal in the storage device 220.

FIG. 8 illustrates an example in which the temporary storage unit 640 is implemented outside the security device 510. According to an embodiment, the temporary storage unit 640 may be included within the security device 510 as well.

FIG. 8 exemplifies a case in which the storage device 220 and the temporary storage unit 640 are configured as separate constituent elements. According to an embodiment, the storage device 220 and the temporary storage unit 640 may be implemented as a single constituent element. For example, the temporary storage unit 640 may be included in the storage device 220.

An apparatus according to various embodiments may analyze a writing operation of an OS for a storage device, to detect hacking in real time. The apparatus may identify whether the writing operation of the OS is a normal operation. For example, in response to the writing operation of the OS being an operation for a code region, the apparatus may identify that the writing operation is an abnormal operation. The apparatus may specify an address and data corresponding to the writing operation identified to be abnormal. The apparatus may prevent the specified data from being recorded in the specified address. For example, the apparatus may process to record the specified data in a temporary storage unit, to prevent the specified data from being recorded in the specified address.

Figure 9:
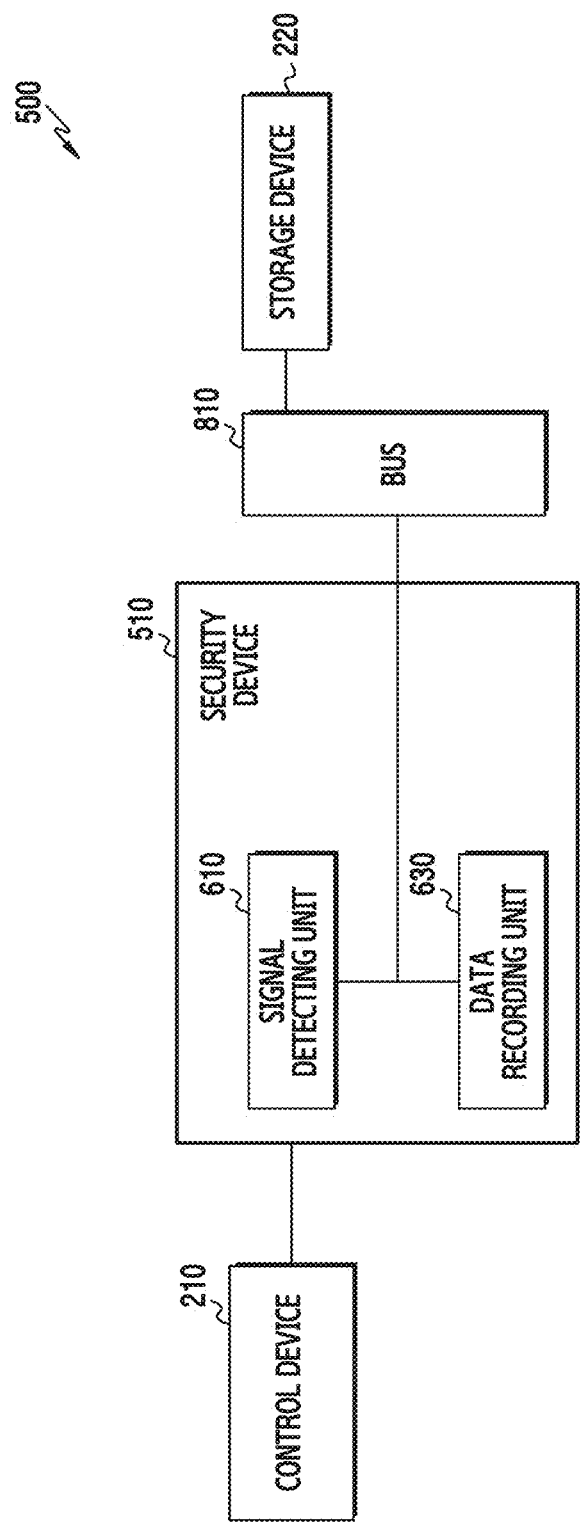
FIG. 9 illustrates a hardware construction of an electronic device sensing hacking through an operation pattern of a signal according to various embodiments.

FIG. 9 illustrates a hardware construction of an electronic device sensing hacking through an operation pattern of a signal according to various embodiments. This hardware construction may be included in the electronic device 500 illustrated in FIG. 5.

Referring to FIG. 9, the electronic device 500 may include the control device 210, the storage device 220, the security device 510, and/or the bus 810. The security device 510 may include the signal detecting unit 610 and/or the data recording unit 630 illustrated in FIG. 6.

The control device 210 may store data in the storage device 220 through the bus 810, for the sake of storing, etc. of a result and/or data of execution of an application. The data may be transmitted through a write signal. The write signal may include an address and data. The data recording unit 630 may record data of the write signal. If the data of the write signal is updated, the data recording unit 630 may record the updated data. In response to there being the updated data, the signal detecting unit 610 may trace whether a structure of the updated data is changed. If the structure of the updated data is changed, the signal detecting unit 610 may detect data related with the changed data, or the write signal, as data or signal related with hacking. For example, if the structure of data included in the write signal includes a linked-list of order of data A, data B, and data C, but a data structure stored in the storage device 220 is changed into the data A and the data C, the signal detecting unit 610 may detect data or signal related with the data B, as data or signal related with hacking. For example, if an address indicated by the data A is changed from an address of the data B to an address of the data C, the signal detecting unit 610 may detect the data B or a signal related with the data B, as a signal related with hacking.

The security device 510 according to various embodiments may group an operation of a write signal, to specify an address and data. The security device 510 may group the operation of the write signal through data pattern matching. For example, by using the data pattern matching, the security device 510 may sense hacking that uses modulation of a linked-list. The linked-list may be a list which may keep a relation between respective nodes in a node, to make easy insertion and/or elimination of a middle node. The linked-list may be a list in which node arrangement is not consistent with an address and is made independently from a storage space. In response to not being capable of specifying an address of a portion in which modulation has occurred due to hacking, the apparatus may specify a data pattern recorded in a corresponding region. The apparatus may monitor hacking with a criterion of the data pattern. Through the aforementioned method, while sensing hacking in real time, the apparatus may decrease a complexity of the apparatus, and may reduce a spatial size of the apparatus.

Figure 10:
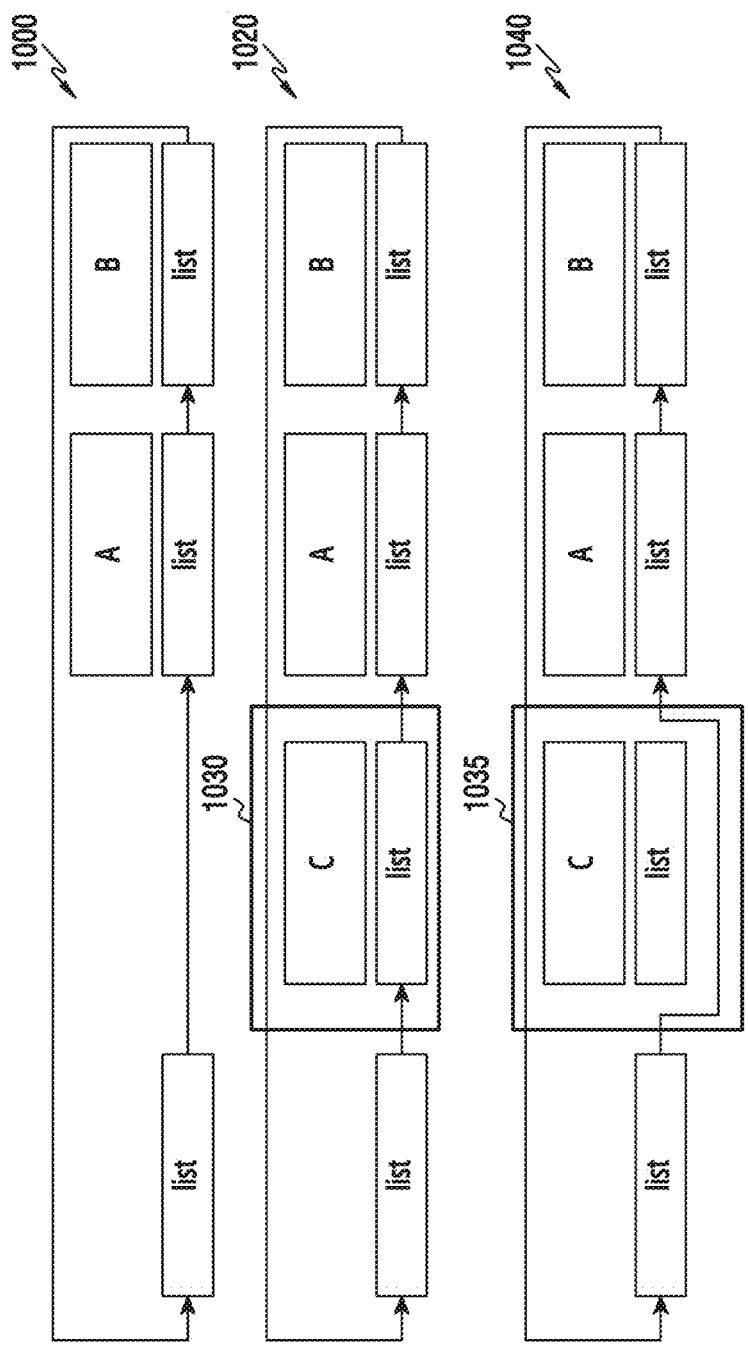
FIG. 10 illustrates an example of sensing hacking through a data pattern according to various embodiments.

FIG. 10 illustrates an example of sensing hacking through a data pattern according to various embodiments. This hacking sensing may be performed in the security device 510 illustrated in FIG. 5.

Referring to FIG. 10, the security device 510 may record a list structure 1000 corresponding to an operation of a write signal. The list structure 1000 may include data A and data B.

A list structure 1020 may be what the list structure 1000 is updated according to a write signal. The list structure 1020 may include data C as well as the data A and/or the data B. The data C may be data generated by the control device 210, etc. illustrated in FIG. 5, or may be data generated by hacking. In response to the updating of the list structure being achieved like the list structure 1020, the security device 510 may monitor the list structure 1020 for the sake of hacking prevention.

A list structure 1040 may be a list structure stored in the storage device. The list structure 1040 may be a list structure that the signal detecting unit 610 is monitoring. The list structure 1040 may be what the list structure 1020 is modulated. The list structure 1040 may have a structure 1035 in which the data C is unlinked in the list structure 1020. In this case, the signal detecting unit 610 may recognize that an address indicating the data C is changed into an address indicating the data A. The signal detecting unit 610 may detect the data C or a signal related with the data C, as data or signal related with hacking.

The security device 510 may process the detected data or signal in order to prevent hacking. For example, the security device 510 may discard the detected data or signal. For another example, the security device 510 may temporarily store the detected data or signal in the temporary storage unit 640.

Figure 11:
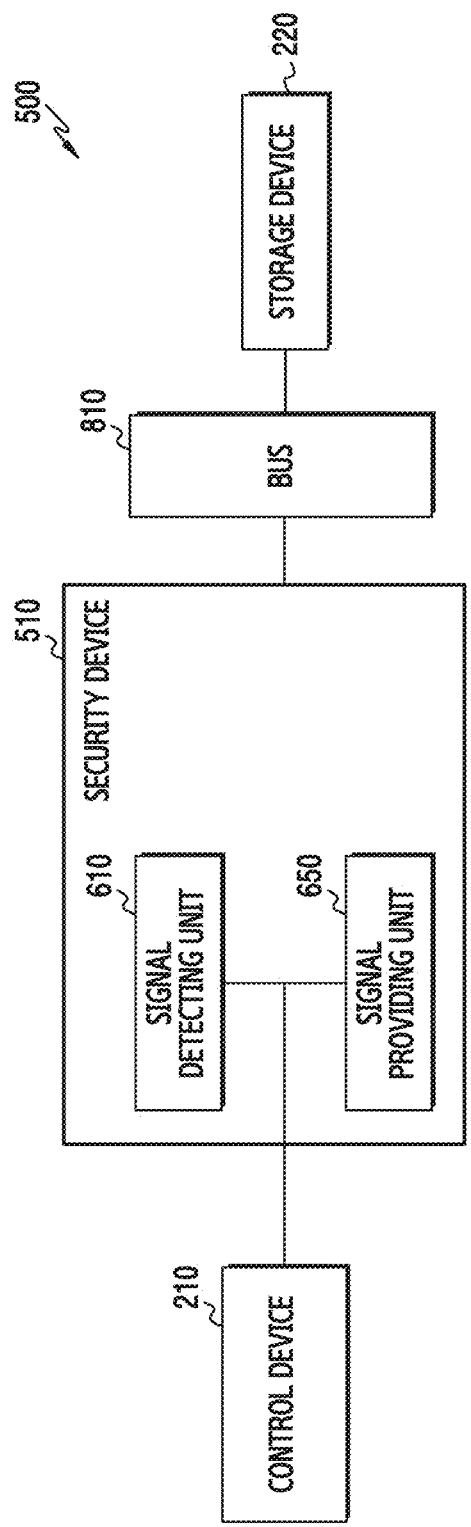
FIG. 11 illustrates a hardware construction of an electronic device predicting hacking through a signal according to various embodiments.

FIG. 11 illustrates a hardware construction of an electronic device predicting hacking through a signal according to various embodiments. This hardware construction may be performed by the electronic device 500 illustrated in FIG. 5.

The electronic device 500 may include the control device 210 illustrated in FIG. 5, the security device 510, the storage device 220, and/or the bus 810. The security device 510 may include the signal detecting unit 610 and/or the signal providing unit 650 illustrated in FIG. 6.

The control device 210 may transmit a read request signal to the storage device 220. The read request signal may be received to the storage device 220 through the security device 510. The signal detecting unit 610 may identify whether the read request signal is a signal vulnerable to hacking, based on an address included in the read request signal. For example, if the read request signal being a signal includes private information, the signal detecting unit 610 may identify that the read request signal is a signal vulnerable to hacking. The signal providing unit 650 may attach a tag to the read request signal in order to predict hacking that may occur in the future. According to an embodiment, the signal providing unit 650 may transmit a tag signal independent of the read request signal in order to predict hacking that may occur in the future. Through the tag or the tag signal, the security device 510 may trace a signal or data which is generated based on the read request signal. The security device 510 may record operations of the traced data or signal, to predict hacking.

Figure 12:
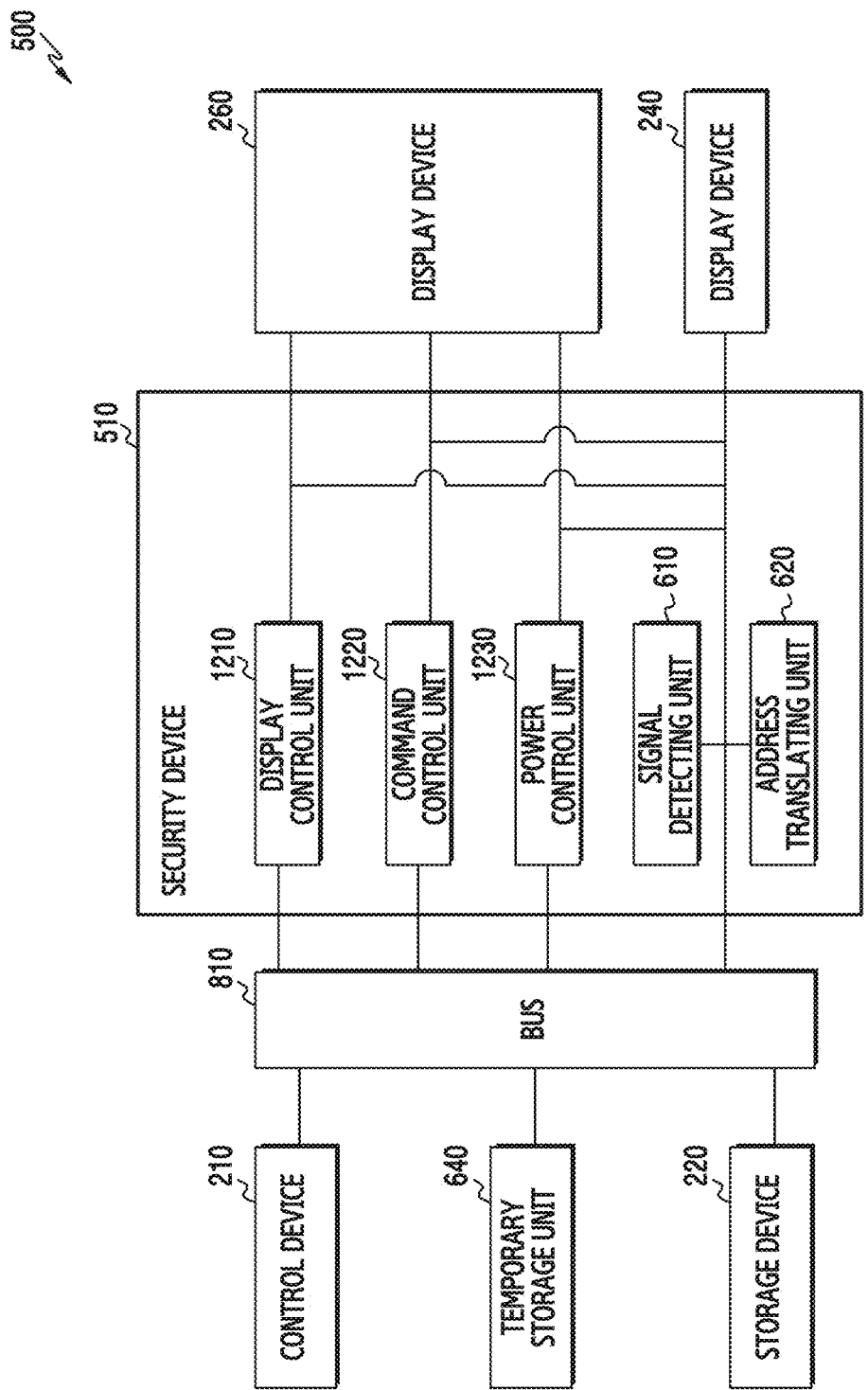
FIG. 12 illustrates a hardware construction of an electronic device sensing hacking through a signal of an application region according to various embodiments.

FIG. 12 illustrates a hardware construction of an electronic device sensing hacking through a signal of an application region according to various embodiments. This hardware construction may be included in the electronic device 500 illustrated in FIG. 5.

Referring to FIG. 12, the electronic device 500 may include the control device 210, the temporary storage unit 640, the storage device 220, the bus 810, the security device 510, the display device 260, and/or the sensing device 240. The security device 510 may include the signal detecting unit 610, the address translating unit 620, a display control unit 1210, a command control unit 1220, and/or a power control unit 1230.

The control device 210 may be operatively coupled with the display device 260 through the bus 810. The control device 210 may transmit a signal through the display control unit 1210, in order to display a UI, etc. on the display device 260. The control device 210 may transmit a signal through the command control unit 1220, in order to update the UI, etc. displayed on the display device 260. The control device 210 may transmit a signal through the power control unit 1230, in order to control power of the display device 260. The sensing device 240 may be a camera. If a signal is transmitted from the sensing device 240 although the display device 260 is inactivated, or if a signal is received to the sensing device 240 although the display device 260 is inactivated, the security device 510 may detect the signals as signals related with hacking. This is because using the sensing device 240 without a screen such as a preview, etc. may be irrelevant to a user's intention.

The address translating unit 620 may translate an address included in a detected signal into an address of the temporary storage unit 640. Through the change of the address included in the detected signal, the security device 510 may intercept that the detected signal is transmitted to the control device 210 or the storage device 220. Though not illustrated in FIG. 12, according to an embodiment, the security device 510 may generate a warning message through the signal providing unit 650 illustrated in FIG. 6. The display device 260 may display the generated warning message.

As described above, the electronic device 500 may identify a hacking possibility on the basis of a relation between constituent elements. FIG. 12 exemplifies a relation between the display device 260 and the sensing device 240, but a similar procedure even between other devices may be performed. According to an embodiment, the security device 510 may add a device of monitoring respective constituent elements to each constituent element.

Figure 13:
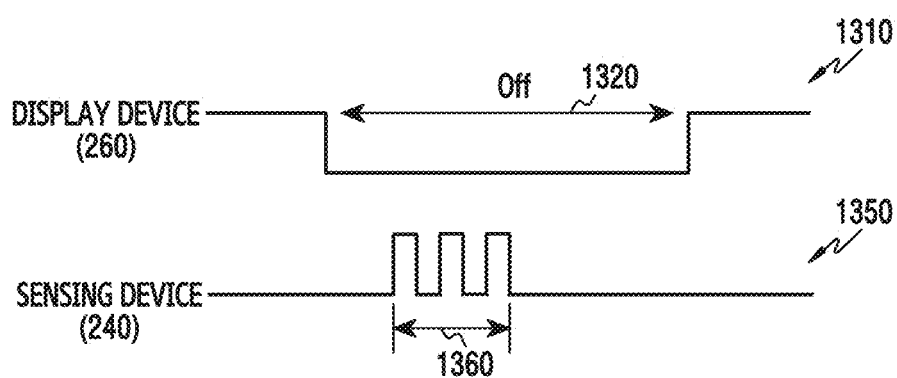
FIG. 13 illustrates an example of a signal of an application region according to various embodiments.

FIG. 13 illustrates an example of a signal of an application region according to various embodiments.

Referring to FIG. 13, a signal 1310 may be a signal for the display device 260 illustrated in FIG. 5. The signal 1310 may indicate that the display device 260 is in an inactivation state at a duration 1320.

A signal 1350 may be a signal for the sensing device 240 illustrated in FIG. 5. The signal 1350 may indicate that the sensing device 240 is in an activation state at a duration 1360. The sensing device 240 may be a camera.

The signal 1310 and the signal 1350 may share the same time axis. The signal 1310 and the signal 1350 may indicate that the sensing device 240 is being activated while the display device 260 is being inactivated. In this situation, a user, etc. may not use a preview screen, etc., so the security device 500 may detect the signal 1350 as a hacking signal.

Figure 14:
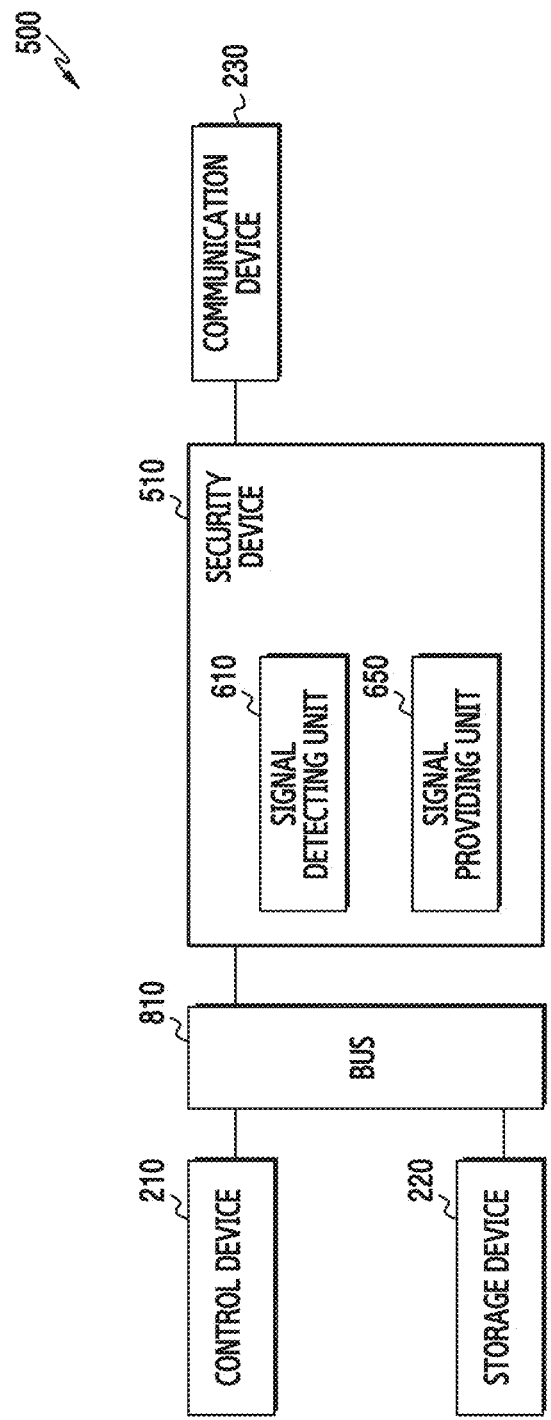
FIG. 14 illustrates another hardware construction of an electronic device sensing hacking through a signal of an application region according to various embodiments.

FIG. 14 illustrates another hardware construction of an electronic device sensing hacking through a signal of an application region according to various embodiments. This hardware construction may be included in the electronic device 500 illustrated in FIG. 5.

The electronic device 500 may include the control device 210 illustrated in FIG. 5, the storage device 220, the bus 810, the security device 510, and/or the communication device 230. The security device 510 may include the signal detecting unit 610 and/or the signal providing unit 650 illustrated in FIG. 6.

The control device 210 may transmit a signal to the communication device 230 through the bus 810. The signal may be a signal transmitted to another device through the communication device 230. The control device 210 may receive a signal from the communication device 230 through the bus 810.

The signal detecting unit 610 may detect whether a signal transmitted to the communication device 230 or a signal received from the communication device 230 is a signal related with hacking. The signal detecting unit 610 may compare source port numbers of the signals and processor identifiers (ID), to detect whether the signal is a signal related with hacking. For example, the signal detecting unit 610 may detect a signal transmitted or generated through an application having no relation with the communication device 230, as a signal related with hacking, based on the source port number and the processor ID. For another example, if it is identified that a signal accompanied by a flag is exposed to a region not corresponding to the flag, the signal detecting unit 610 may detect signals for the signal accompanied by the flag, as signals related with hacking.

The signal providing unit 650 may insert a flag into a signal or data needing security (for example, private information, financial information, etc. that must not be leaked). The signal providing unit 650 may insert a tag into a signal or data needing hacking monitoring (for example, a signal or data identified to be vulnerable to hacking through the signal detecting unit 610). For example, the signal providing unit 650 may insert a tag into a signal received from the external.

If it is identified that a signal related with hacking is received through the communication device 230, the signal providing unit 650 may convert the signal related with hacking, to generate a signal including null data. For example, assume that a signal including data which may leak private information is received through the communication device 230. The signal detecting unit 610 may detect the received signal as a signal related with hacking, based on the data included in the received signal. In response to this, the signal providing unit 650 may convert the received signal and generate a signal including null data, in order to stop transmission of the received signal.

As mentioned above, the security device 510 may identify a hacking possibility on the basis of a relation between an application and constituent elements. FIG. 13 exemplifies a relation with the communication device 230, but a similar procedure may be performed even for other constituent elements.

Figure 15:
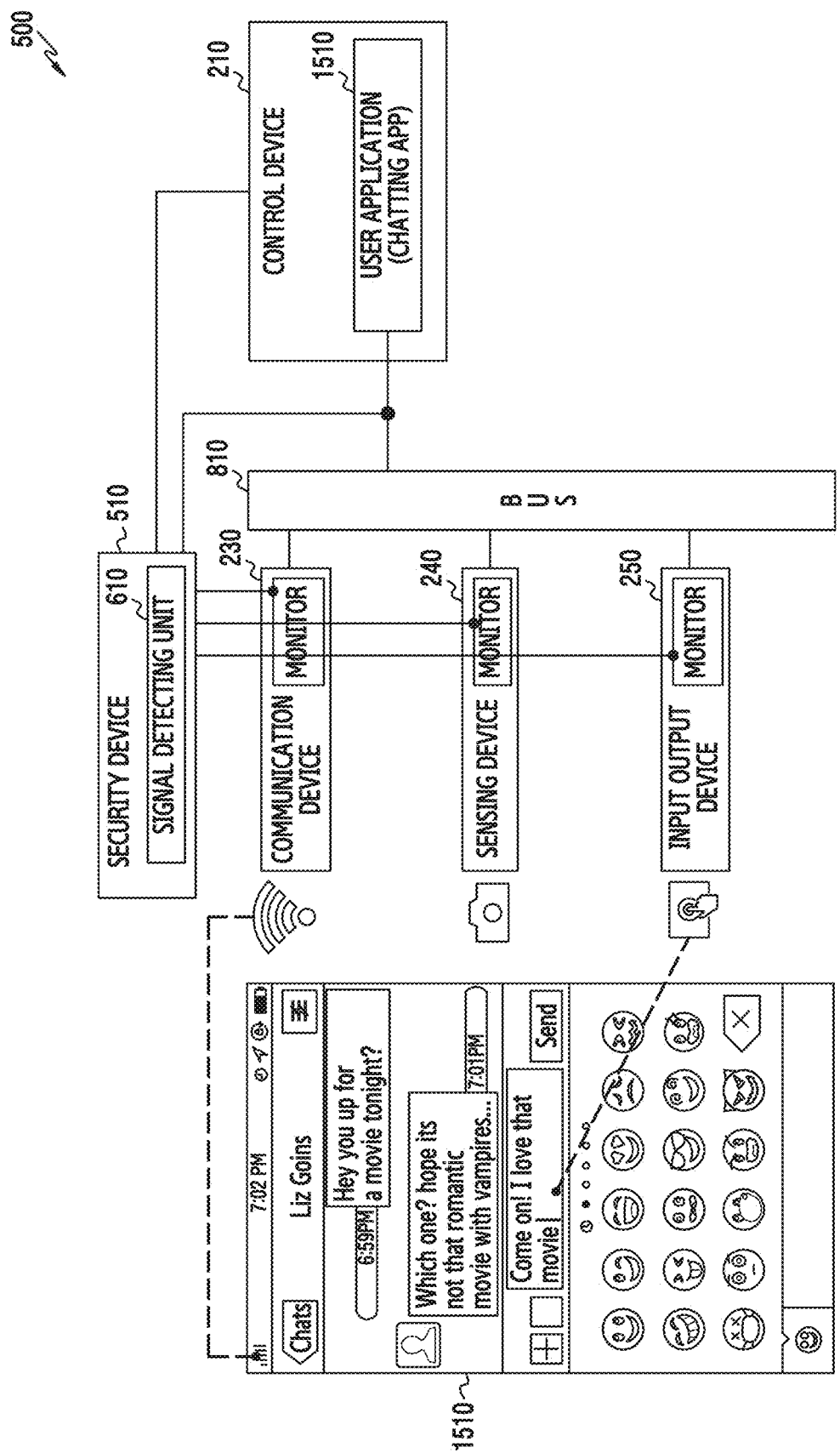
FIG. 15 illustrates an operation example of an electronic device sensing hacking according to various embodiments.

FIG. 15 illustrates an operation example of an electronic device sensing hacking according to various embodiments. This operation example may be performed by the electronic device 500 illustrated in FIG. 5.

The electronic device 500 may include the control device 210 illustrated in FIG. 5, the communication device 230, the sensing device 240, the input output device 250, and/or the security device 510. The security device 510 may include the signal detecting unit 610 illustrated in FIG. 6.

The control device 210 may execute a user application (for example, a chatting app) 1510 by a user input, etc. The control device 210 may transmit signals generated by execution of the user application, to the respective peripheral devices 520. The security device 510 may sense whether a signal related with hacking has been included in signals between the control device 210 and the peripheral device 520.

The signal detecting unit 610 included in the security device 510 may analyze signals between the control device 210 and the peripheral device 520. For example, the electronic device 500 being running the user application 1510 may activate the communication device 230, the sensing device 240, and/or the input output device 250.

By running the application 1510 (running the chatting app), the control device 210 may activate the communication device 230. The communication device 230 may transmit/receive text information, etc. through various communication schemes.

For the sake of the running of the application 1510 (the running of the chatting app), the control device 210 may activate the input output device 250. In the example of FIG. 15, the input output device 250 may forward a user touch input to the control device 210.

In the example of FIG. 15, the sensing device 240 may have no relation with the running of the user application 1510. Despite so, if the control device 210 activates the sensing device 240, a signal forwarded from the control device 210 to the sensing device 240 may be a signal related with hacking. Also, if the control device 210 receives a signal from the previously activated sensing device 240, the signal may be a signal related with hacking. This is because the running of the user application 1510 and the activation of the sensing device 240 may not have a relation.

The signal detecting unit 610 may detect a signal between the control device and the sensing device 240, as a signal related with hacking. For example, the signal detecting unit 610 may identify whether the signal between the control device 210 and the peripheral device 520 includes data for activating a device not related with the signal. In response to the signal between the control device 210 and the peripheral device 520 activating the device not related with the signal (for example, the sensing device 240), the signal detecting unit 610 may detect the signal between the control device 210 and the peripheral device 520, as a signal related with hacking.

According to an embodiment, the security device 510 may discard the signal between the control device 210 and the peripheral device 520 as well.

Figure 16:
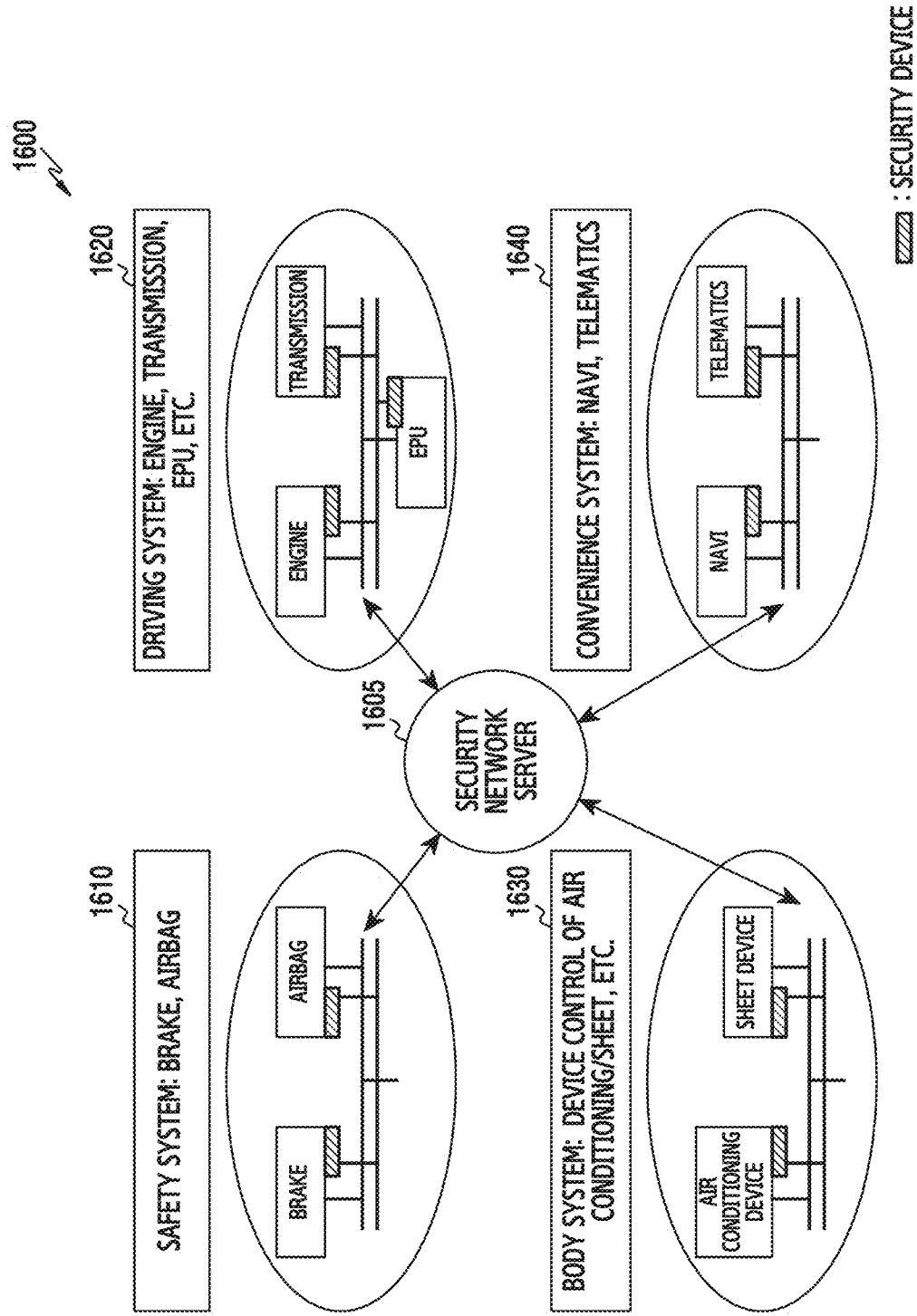
FIG. 16 illustrates an example in which a security device according to various embodiments is mounted on a car.

FIG. 16 illustrates an example in which a security device according to various embodiments is mounted on a car. The security device mounted on the car may be the security device 510 illustrated in FIG. 5.

Referring to FIG. 16, a security network environment 1600 may include a security network server 1605, a safety system 1610, a driving system 1620, a body system 1630, and/or a convenience system 1640.

The safety system 1610 may include devices for a driving safety of a car or a safety of a driver. For example, the safety system 1610 may include a brake, an airbag, etc. The car may include a communication function. The car may seek a convenience through the communication function. However, owing to the communication function, the car may be exposed to hacking. For example, a hacking attack may cause a malfunction of the brake of the car. To detect this hacking attack, and cope with the hacking attack, the security device 510 illustrated in FIG. 5 may be installed in the brake, the airbag, etc., respectively. The security device 510 may detect a signal related with hacking received to the car. The security device 510 may intercept the reception of the detected signal, to protect the car from the hacking attack. The security device 510 may communicate with the security network sever 1605. The security device 510 may receive a signal including updating information from the security network server 1605, to perform updating.

The driving system 1620 may include devices related with a driving system of a car. For example, the driving system 1620 may include an engine control unit (ECU), an engine, a transmission, etc. Because the car may include a communication function, the driving system 1620 may be exposed to a hacking attack. In response to the driving stem 1620 malfunctioning due to hacking, a user of the car may run into danger. To detect this hacking attack, and cope with the hacking attack, the security device 510 may be installed in each of the ECU, the engine, the transmission, etc. The security device 510 may detect a signal related with hacking, received to the car. The security device 510 may intercept the reception of the detected signal, to protect the car from the hacking attack. The security device 510 may communicate with the security network server 1605, to perform updating for the driving system 1620.

The body system 1630 may include devices related with a structure of a car. For example, the body system 1630 may include an air conditioning device, a sheet device, etc. Because the car may include a communication function, the body system 1630 may be exposed to a hacking attack. In response to the driving system 1630 malfunctioning due to hacking, a user of the car may run into danger. For example, in response to a sheet device on which a user who is driving is seated being moved, the user may run into danger. To predict and detect this hacking attack, and cope with the hacking attack, the security device 510 may be installed in each of the air conditioning device and/or the sheet device. The security device 510 may detect a signal related with hacking, received to the car, and protect the body system 1630 from a hacking attack.

The convenience system 1640 may include devices for a user's convenience. For example, the convenience system may include a navigation system, telematics, etc. The convenience system 1640 may be exposed to a hacking attack due to a communication function of the car. For example, the navigation system may malfunction due to reception of a signal related with hacking. To cope with the hacking attack, the security device 510 may predict the hacking attack, and detect the hacking attack, and cope with the hacking attack.

The respective systems (for example, the safety system 1610, the driving system 1620, the body system 1630, the convenience system 1640, etc.) may perform information exchange mutually. The information exchange may provide a convenience to a user, etc. However, owing to trade-off for this, the information exchange may provide an environment capable of being easily exposed to a hacking attack as well. The security device 510 may be installed in each system, to share data, a signal, etc. related with hacking. Also, the security device 510 may update the security device 510 through communication with the security network server 1605. Through the above-described information sharing and updating, the security device 510 may flexibly cope with hacking.

An apparatus according to various embodiments described above may include a transmission and/or reception unit, and a control unit operatively coupled with the transmission and/or reception unit. The control unit may be configured to detect whether a first signal transmitted from a control device to a storage device includes a designated address, and may be configured to transmit a second signal to the control device, if the first signal includes the designated address. The first signal may be a signal of transmitting, by the control device, a request for data to the storage device, and the second signal may be a signal for detecting whether uncommon data has been included in a signal generated from the first signal. The control unit may be further configured to display, on the display device, a warning message including information about the first signal, if the first signal includes the designated address.

Also, the control unit may be further configured to detect whether a third signal transmitted from the control device to the storage device includes an address of an immutable region, and may be further configured to translate an address of the third signal and intercept transmission to the storage device, if the third signal includes the address of the immutable region. The third signal may include data for recording, by the control device, in the storage device. The control unit may be further configured to display, on the display device, a warning message including information about the third signal, if the third signal includes the address of the immutable region. Also, the control unit may be further configured to discard the third signal, if the third signal includes the address of the immutable region.

Also, the control unit may be further configured to record data of a third signal, based on an address included in the third signal transmitted from the control device to the storage device, and may be further configured to detect whether the recorded data is updated, and may be further configured to, if the recorded data is updated, detect whether a structure of the data is changed after the third signal is stored in the storage device, and may be further configured to, if the structure of the data is changed, detect the changed data or a signal related with the changed data, and may be further configured to discard the changed data or a signal related with the changed data. The third signal may include data for recording, by the control device, in the storage device. The control unit may be further configured to, in response to the changed data or the signal related with the changed data being detected, display a warning message on the display device.

Also, the control unit may be further configured to detect whether a fourth signal between the control device and another device includes data for activating a device not related with the fourth signal, and may be further configured to intercept transmission of the fourth signal, if the fourth signal includes the data for activating the device not related with the fourth signal. Also, the control unit may be further configured to discard the fourth signal, if the fourth signal includes the data for activating the device not related with the fourth signal.

Figure 17:
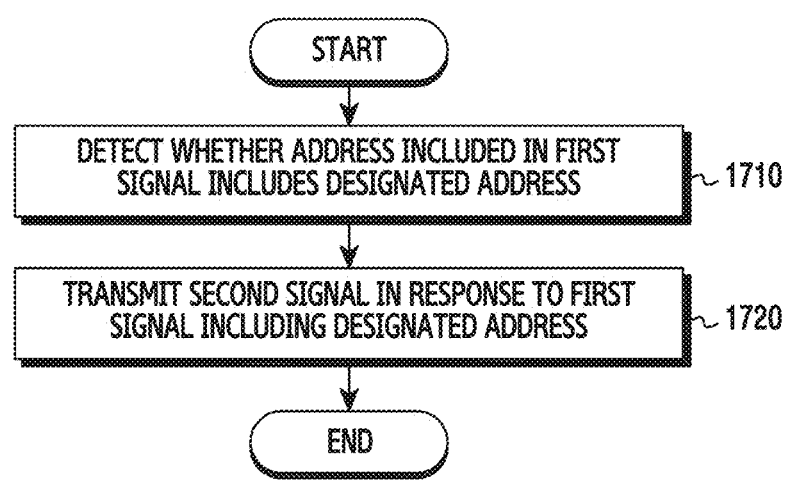
FIG. 17 is a flowchart illustrating an operation of an apparatus according to various embodiments.

FIG. 17 is a flowchart illustrating an operation of an apparatus according to various embodiments. This operation may be performed by the security device 510 illustrated in FIG. 5. The security device 510 may be denoted as an apparatus as well.

Referring to FIG. 17, in step 1710, the security device 510 may detect whether a first signal transmitted from the control device 210 to the storage device 220 includes a designated address. The first signal may be a signal of transmitting, by the control device 210, a request for data to the storage device 220. The first signal may correspond to a read request signal. The designated address may be an address previously defined by setting of a user and/or setting of the electronic device 500. The designated address may be an address indicating a position in which hacking is easy to occur.

In step 1720, if the first signal includes the designated address, the security device 510 may transmit a second signal to the control device 210. The first signal may be processed after being received to the control device 210. For example, the control device 210 may generate various control signals, etc., based on the first signal. The generated various control signals may be signals having a great danger of being exposed to hacking. The security device 510 may trace the generated various control signals. For example, the security device 510 may insert a tag to the generated several control signals, or add a tag signal. The second signal may be a signal for detecting whether uncommon data has been included in the signal generated from the first signal. The second signal may represent a tag or tag signal.

The security device 510 according to various embodiments may predict whether hacking will be able to occur through the first signal. If it is identified that the first signal is a signal easy to be exposed to hacking, the security device 510 may monitor the first signal and signals generated from the first signal, in order to predict hacking occurrence or non-occurrence.

Figure 18:
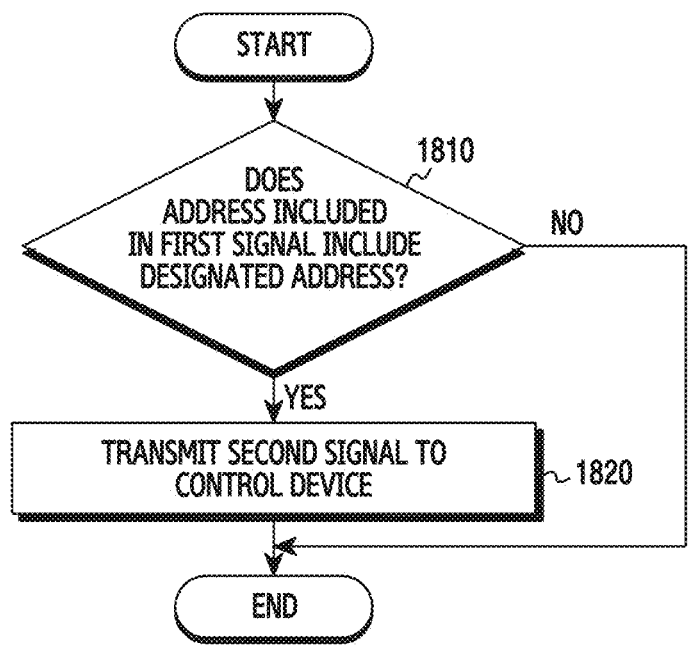
FIG. 18 is a flowchart illustrating an operation of an apparatus predicting hacking according to various embodiments.

FIG. 18 is a flowchart illustrating an operation of an apparatus predicting hacking according to various embodiments. This operation flow may be performed by the security device 510 illustrated in FIG. 5.

Referring to FIG. 18, in step 1810, the security device 510 may detect whether a first signal transmitted from the control device 210 to the storage device 220 includes a designated address. If the first signal does not include the designated address, the security device 510 may no longer trace the first signal. This is because the first signal may be a signal having a small danger of being exposed to hacking if not including the designated address. Through this operation, the security device 510 may reduce an occupation area of a circuitry, and may decrease a complexity, and may cope with hacking efficiently.

If the first signal includes the designated address, in step 1820, the security device 510 may transmit a second signal to the control device. Through the transmission of the second signal, the security device 510 may trace the first signal and signals originating from the first signal. Through this tracing, the security device 510 may detect whether hacking occurs in the first signal and the signals originating from the first signal, and/or whether hacking may occur.

The security device 510 according to various embodiments may predict hacking, based on a read request signal. By predicting hacking on the basis of the read request signal, the security device 510 according to various embodiments may cope with a hacking attack more flexibly.

Figure 19:
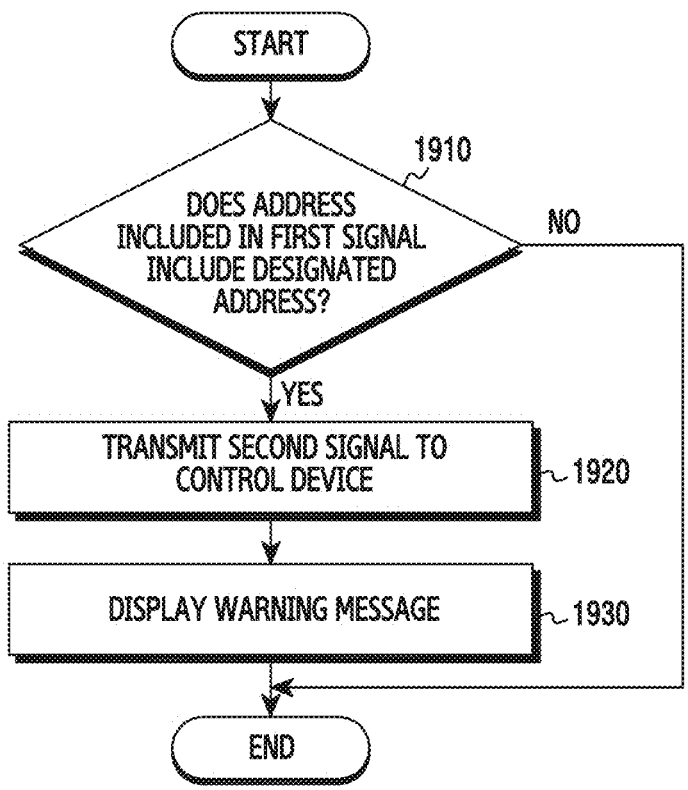
FIG. 19 is a flowchart illustrating an operation of an apparatus predicting hacking and displaying a warning message according to various embodiments.

FIG. 19 is a flowchart illustrating an operation of an apparatus predicting hacking and displaying a warning message according to various embodiments. This operation flow may be performed by the security device 510 illustrated in FIG. 5.

Referring to FIG. 19, step 1910 and step 1920 may correspond to step 1810 and step 1820 of FIG. 18.

In response to hacking being predicted, in step 1930, the security device 510 may display a warning message on the display device 260 illustrated in FIG. 5, in order to warn a user that hacking may occur.

Unlike an example of FIG. 19, operation of step 1920 and operation of step 1930 may be performed simultaneously, or may be performed in inverse order.

The security device 510 according to various embodiments may display a situation in which hacking may occur to a user, etc., and provide better security.

Figure 20:
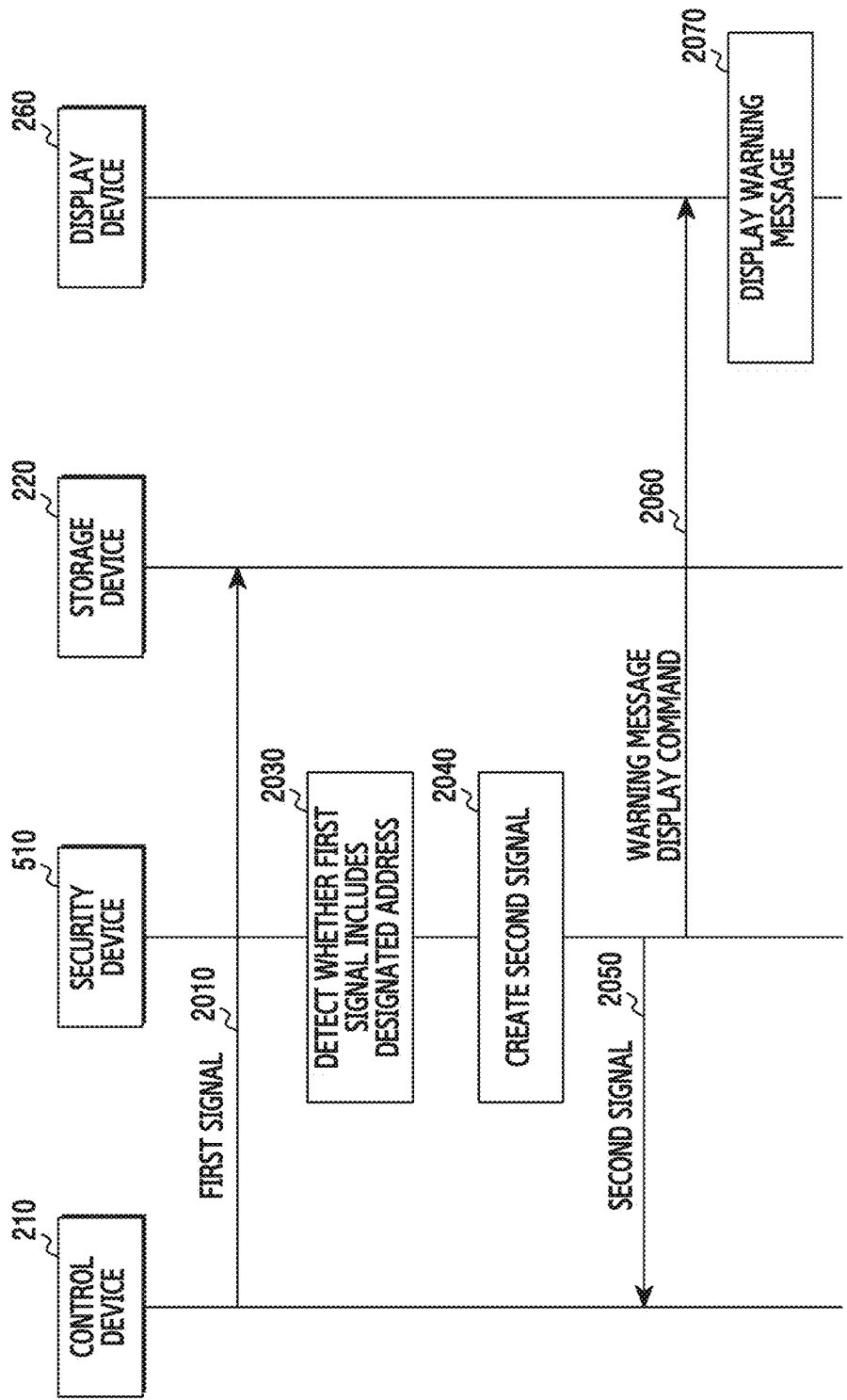
FIG. 20 illustrates a signal flow of an electronic device predicting hacking according to various embodiments.

FIG. 20 illustrates a signal flow of an electronic device predicting hacking according to various embodiments. This signal flow may be provided within the electronic device 500 illustrated in FIG. 5.

Referring to FIG. 20, in step 2010, the control device 210 may transmit a first signal to the storage device 220. The first signal may be a read request signal. For the sake of execution of an application and/or control of the electronic device 500, the control device 210 may request an instruction, data, etc. to the storage device 220. The read request signal may be a signal of requesting the instruction, the data, etc.

In step 2030, the security device 510 may detect whether the first signal includes a designated address. The security device 510 may identify whether an address of the first signal is the designated address. For example, if the designated address includes an address of the communication device 230 illustrated in FIG. 5, and the first signal includes the address of the communication device 230, the security device 510 may detect that the address of the first signal includes the designated address.

In response to the first signal including the designated address, in step 2040, the security device 510 may generate a second signal. The second signal may be a signal for tracing the first signal. The second signal may be a signal for tracing signals generated from the first signal.

In step 2050, the security device 510 may transmit the second signal to the control device 210. Through the second signal, the security device 510 may detect whether hacking occurs.

In step 2060, the security device 510 may transmit a warning message display command to the display device 260. In response to this, the display device 260 may receive the warning message display command.

Each of operations of step 2050 and step 2060 may be performed sequentially, or may be performed in inverse order, or may be performed simultaneously.

In step 2070, the display device 260 may display a warning message. Through the warning message, a user of the electronic device 500 may predict that hacking may occur in the electronic device 500.

Step 2060 and step 2070 may be omitted according to an embodiment.

Figure 21:
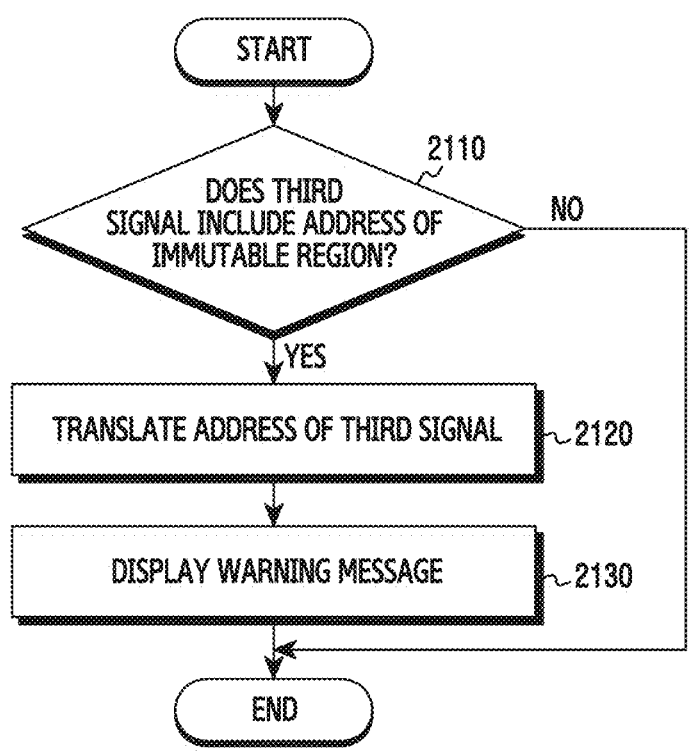
FIG. 21 is a flowchart illustrating an operation of an apparatus sensing hacking according to various embodiments.

FIG. 21 is a flowchart illustrating an operation of an apparatus sensing hacking through a signal according to various embodiments. This operation flow may be performed by the security device 510 illustrated in FIG. 5.

Referring to FIG. 21, in step 2110, the security device 510 may detect whether a third signal includes an address of an immutable region. The third signal may be a signal including data for recording, by the control device, in the storage device 220. The third signal may be a write signal. The control device 210 may store data needing updating and/or data to be newly stored, in the storage device 220 through the write signal. The immutable region may be one of a code region of an OS, a system call table, and an interrupt descriptor table. The immutable region may be a region in which updating may not occur, or is limited. That a specific signal is transmitted to this immutable region may be hacking as well. The security device 510 may detect whether the third signal includes the address of the immutable region, to detect whether hacking occurs in the electronic device 500.

If the third signal does not include the address of the immutable region, the security device 510 may identify that the third signal is not related with hacking, and enable to forward the third signal to the storage device 220.

If the third signal includes the address of the immutable region, in step 2120, the security device 510 may translate the address of the third signal, to intercept transmission to the storage device 220. For example, the security device 510 may change the existing address of the third signal into an address of the temporary storage unit 640 illustrated in FIG. 6, to prevent the third signal from being recorded in the storage device 220.

In step 2130, the security device 510 may display a warning message on the display device 260 illustrated in FIG. 5. The warning message may be a message representing that hacking has occurred. Through the warning message, a user of the electronic device 500 may recognize that hacking has occurred in the electronic device 500. The warning message may be a message of indicating that hacking has been discovered in the third signal and thus transmission has been intercepted. According to an embodiment, step 2130 may be omitted.

By enabling a signal related with hacking not to be stored in the storage device 220, the security device 510 according to various embodiments may prevent hacking. The security device 510 according to various embodiments may detect hacking from the write signal, to maintain a security of the electronic device 500.

Figure 22:
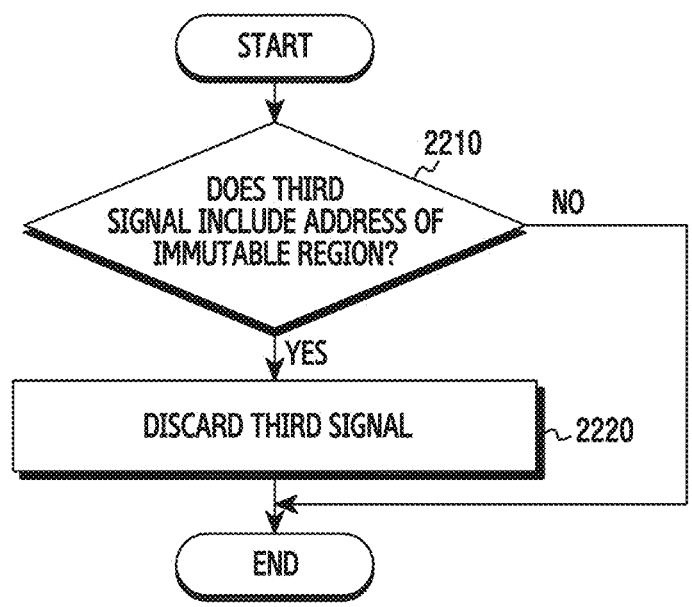
FIG. 22 is a flowchart illustrating another operation of an apparatus sensing hacking through a signal according to various embodiments.

FIG. 22 is a flowchart illustrating another operation of an apparatus sensing hacking through a signal according to various embodiments. This operation flow may be performed by the security device 510 illustrated in FIG. 5.

Referring to FIG. 22, step 2210 may correspond to step 2110 illustrated in FIG. 21.

In step 2220, the security device 510 may discard the third signal. In response to it being identified that the third signal is a signal related with hacking, the security device 510 may discard the third signal.

The security device 510 according to various embodiments may discard the signal related with hacking, to maintain a security of the electronic device 500 illustrated in FIG. 5.

Figure 23:
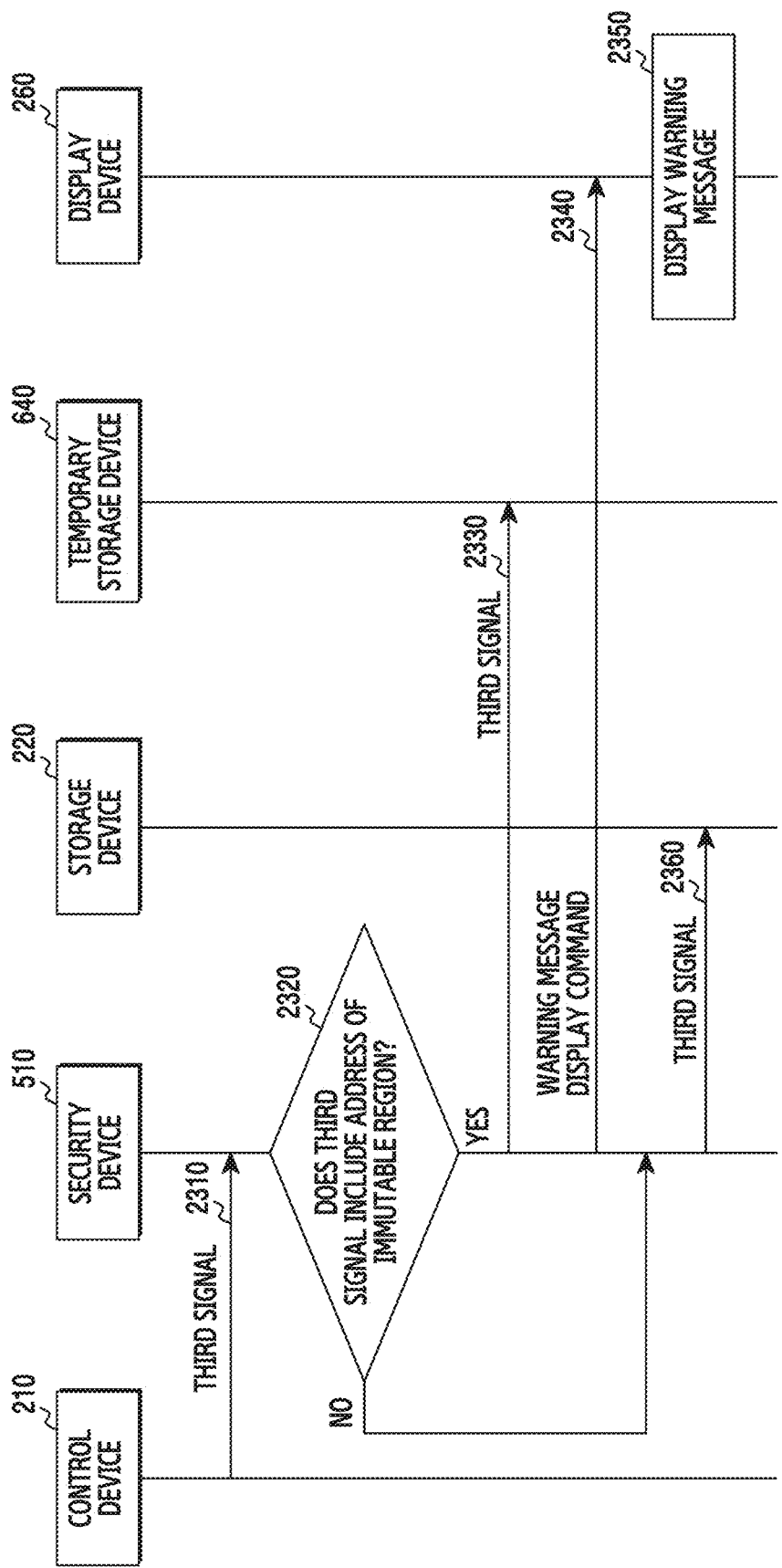
FIG. 23 illustrates a signal flow of an electronic device sensing hacking through a signal according to various embodiments.

FIG. 23 illustrates a signal flow of an electronic device sensing hacking through a signal according to various embodiments. This signal flow may be performed by the electronic device 500 illustrated in FIG. 5.

Referring to FIG. 23, in step 2310, the control device 210 may transmit a third signal to the security device 510. The third signal may be a write signal. The third signal may be transmitted to the storage device 220 through the security device 510. The third signal may include data for recording, by the control device, in the storage device.

In step 2320, the security device 510 may detect whether the third signal includes an address of the immutable region. Because the immutable region is a region in which updating is limited, the security device 510 may detect the third signal as a signal related with hacking, if the third signal includes the address of the immutable region.

If the third signal includes the address of the immutable region, in step 2330, the security device 510 may transmit the third signal to the temporary storage unit 640. The security device 510 may translate an address of the third signal into an address of the temporary storage unit 640, to intercept the transmission of the third signal to the storage device 220.

In step 2340, the security device 510 may transmit a warning message display command to the display device 260. A warning message may be a message of representing that the third signal is a signal related with hacking.

Operation of step 2330 and operation of step 2340 may be performed simultaneously, or may be performed sequentially.

In step 2350, in response to reception of the warning message display command, the display device 260 may display a warning message. Through the warning message, a user of the electronic device 500 may recognize that hacking has occurred in the electronic device 500. Also, the user of the electronic device 500 may recognize that the third signal has been intercepted through the warning message. If the third signal is not the signal related with hacking, the warning message may be stored in the storage device 220 through an input of the user.

If the third signal does not include the address of the immutable region, in step 2360, the security device 510 may transmit the third signal to the storage device 220. The storage device 220 may receive the third signal. The storage device 220 may record data included in the third signal.

Figure 24:
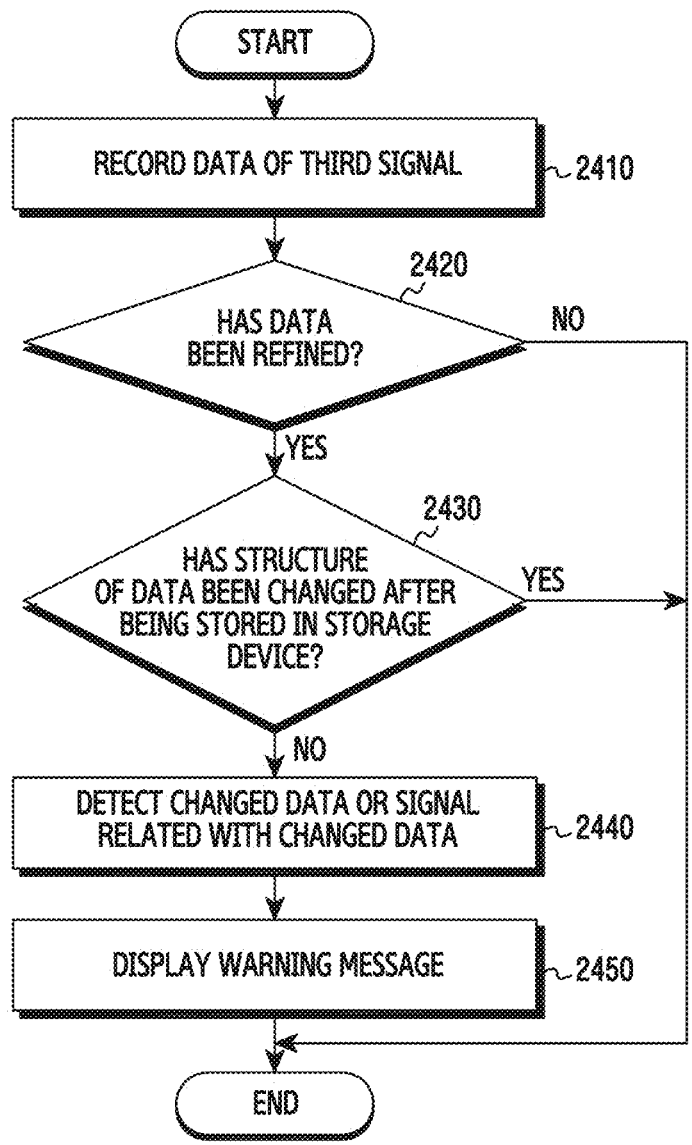
FIG. 24 is a flowchart illustrating an operation of an apparatus sensing hacking through an operation corresponding to a signal according to various embodiments.

FIG. 24 is a flowchart illustrating an operation of an apparatus sensing hacking through an operation corresponding to a signal according to various embodiments. This operation flow may be performed by the security device 510 illustrated in FIG. 5.

Referring to FIG. 24, in step 2410, the security device 510 may record data of a third signal. The security device 510 may monitor updating or non-updating of the data, based on the recorded data.

In step 2420, the security device 510 may identify whether updating of the recorded data is accomplished. If the data is updated, the security device 510 may monitor the updated data.

In response to there being the updating of the data, in step 2430, the security device 510 may monitor whether a structure related with the updated data is changed after being stored in the storage device 220. For example, the security device 510 may monitor whether an address indicating data included in the third signal is changed after being stored in the storage device 220.

If the structure of the data stored in the storage device 220 is changed, in step 2440, the security device 510 may detect the changed data or a signal related with the changed data. For example, if the data structure having a linked-list structure of order of data A, data B, and data C is stored in the storage device 220 and then is changed into a data data structure having a linked-list structure of order of the data A and the data C, the security device 520 may detect the data B or a signal related with the data B (for example, the third signal), as data or a signal related with hacking.

In step 2450, the security device 510 may display a warning message on the display device 260. The warning message may indicate that there is a signal or data identified to be related with hacking, to a user of the electronic device 500. The warning message may indicate that transmission of the signal or data identified to be related with hacking has been intercepted, to the user of the electronic device 500.

Figure 25:
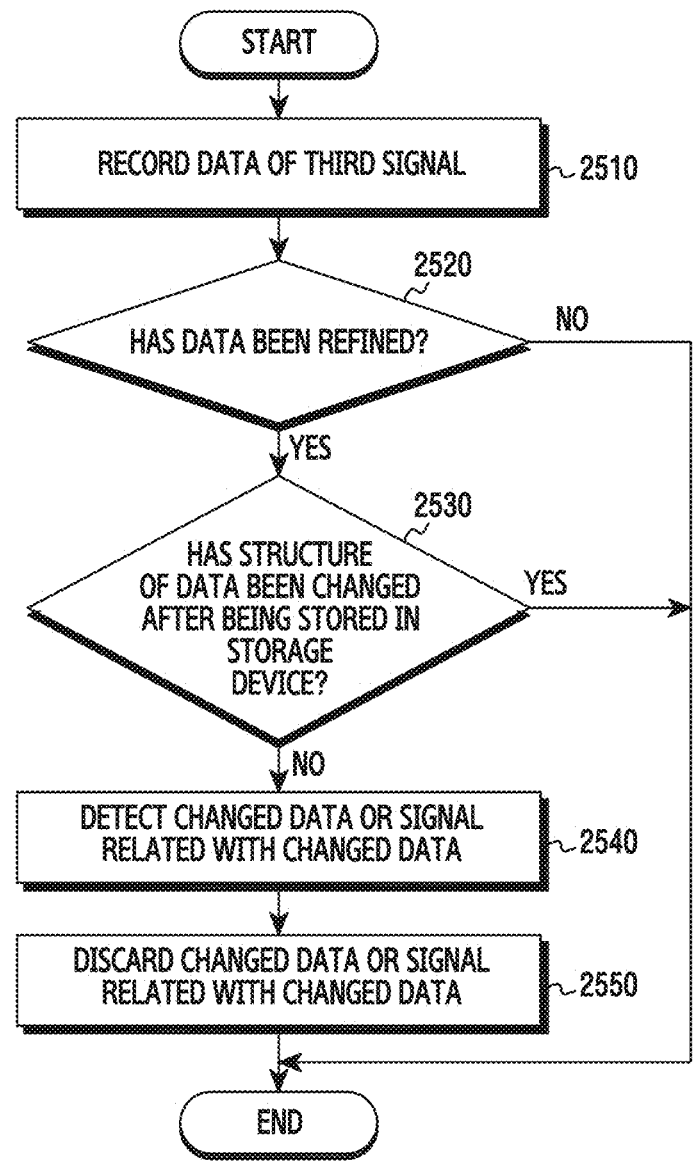
FIG. 25 is a flowchart illustrating another operation of an apparatus sensing hacking through an operation corresponding to a signal according to various embodiments.

FIG. 25 is a flowchart illustrating another operation of an apparatus sensing hacking through an operation corresponding to a signal according to various embodiments. This operation flow may be performed by the security device 510 illustrated in FIG. 5.

Referring to FIG. 25, operations of step 2510 to step 2540 may correspond to operations of step 2410 to step 2440 illustrated in FIG. 24.

In step 2550, the security device 510 may discard changed data or a signal related with the changed data. Operation of step 2550 may be another example of operation of step 2450. In response to it being identified that the changed data or the signal related with the changed data being data related with hacking, the security device 510 may discard the data or signal. Through operation of step 2550, the security device 510 may maintain a security of the electronic device 500.

Figure 26:
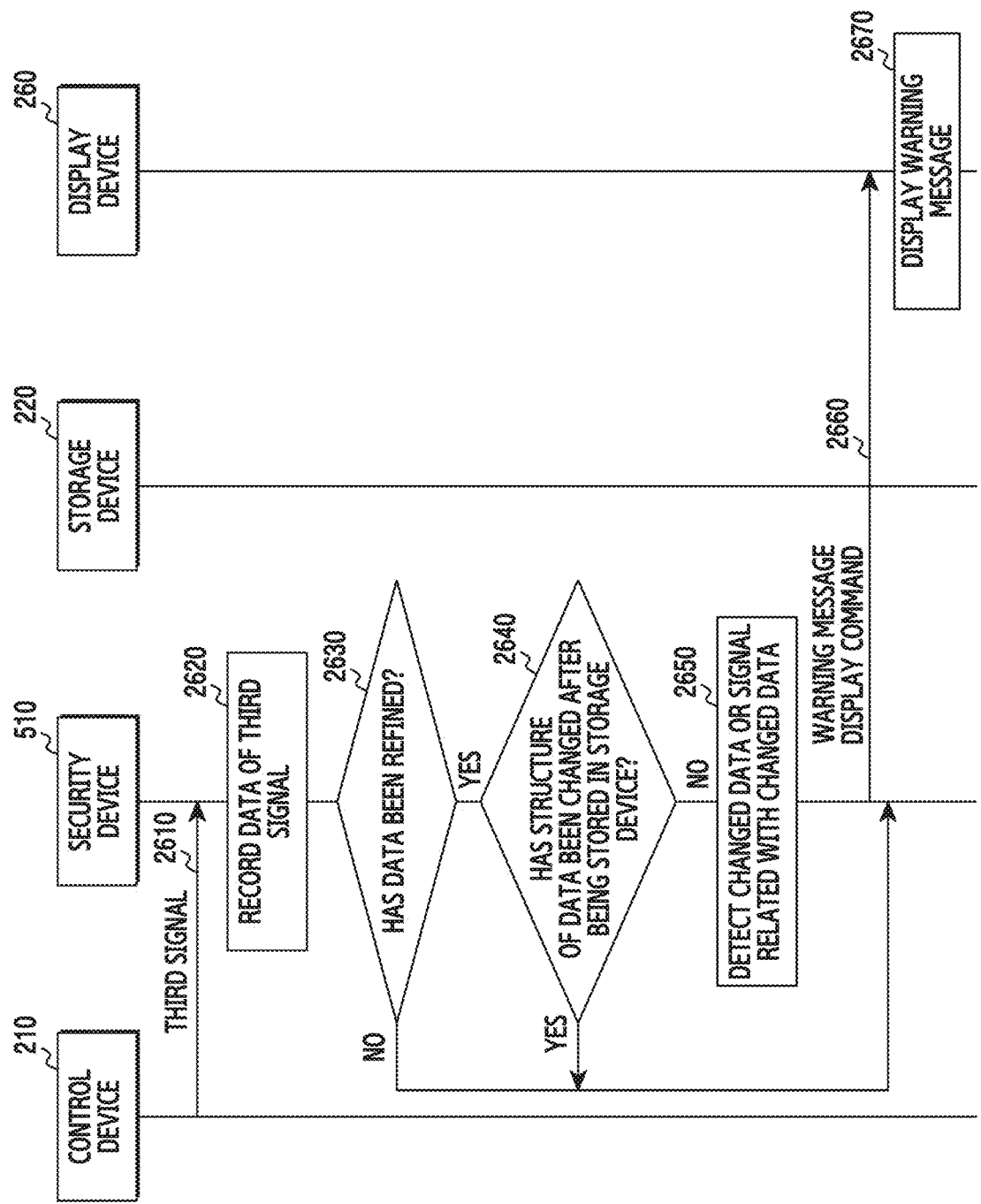
FIG. 26 illustrates another signal flow of an electronic device sensing hacking according to various embodiments.

FIG. 26 illustrates another signal flow of an electronic device sensing hacking according to various embodiments. This signal flow may be performed by the electronic device 500 illustrated in FIG. 5.

Referring to FIG. 26, in step 2610, the control device 210 may transmit a third signal to the security device 510. The third signal may be a signal for recording data in the storage device 220. The third signal may be a signal of controlling an operation of an internal constituent element of the electronic device 500. For example, the third signal may be a signal of controlling operations of the peripheral device 520 of the electronic device 500, the storage device 220, etc. The security device 510 may receive the third signal.

In step 2620, the security device 510 may record data of the third signal. For example, if the third signal includes data A, data B, and data C, the security device 510 may record a data structure of the data A, the data B, and the data C. The recorded data may be used as a reference for identifying whether the data structure is updated.

In step 2630, the security device 510 may identify whether the data has been updated, by using the recorded data structure. For example, if new data is added to the data structure, the security device 510 may recognize that the data of the third signal has been updated.

If it is identified that the data of the third signal has been updated, in step 2640, the security device 510 may detect whether, after the updated data is stored in the storage device 220, a structure of the data has been changed. For example, assume that the structure of the data stored in the storage device 220 has a structure of order of data A and data C. The third signal may be a signal of updating the data structure having the structure of order of the data A and the data C. The third signal may be a signal for adding data B between the data A and the data C. In this case, the data structure may be updated into a structure of order of the data A, the data B, and the data C. The security device 510 may recognize the updating of this data structure (or the adding of the data). The security device 510 may detect whether the structure of the updated data is changed after being stored in the storage device 220.

If the structure of the updated data is changed after being stored in the storage device 220, in step 2650, the security device 510 may detect the changed data or a signal related with the changed data. In the above example, if the data structure is changed in order of the data A and the data C excepting the data B after being stored in the storage device 220, the security device 510 may detect the data B or a signal related with the data B, as data or a signal related with hacking. In detail, if an address indicated by the data A is changed from the data B to the data C, the security device 510 may detect the data B and a signal related with the data B, as data or a signal related with hacking.

In step 2660, the security device 510 may transmit a warning message display command to the display device 260. The display device 260 may receive the warning message display command from the security device 510.

In step 2670, in response to reception of the warning message display command, the display device 260 may display a warning message. Through the warning message, a user of the electronic device 500 may recognize that the electronic device 500 has been exposed to hacking.

The security device 510 according to various embodiments may sense hacking in real time, through operation of step 2610 to operation of step 2670. Through the aforementioned operations, the security device 510 may sense hacking with a higher accuracy. Through the aforementioned operations, the security device 510 may efficiently cope with a hacking attack on the electronic device 500.

Figure 27:
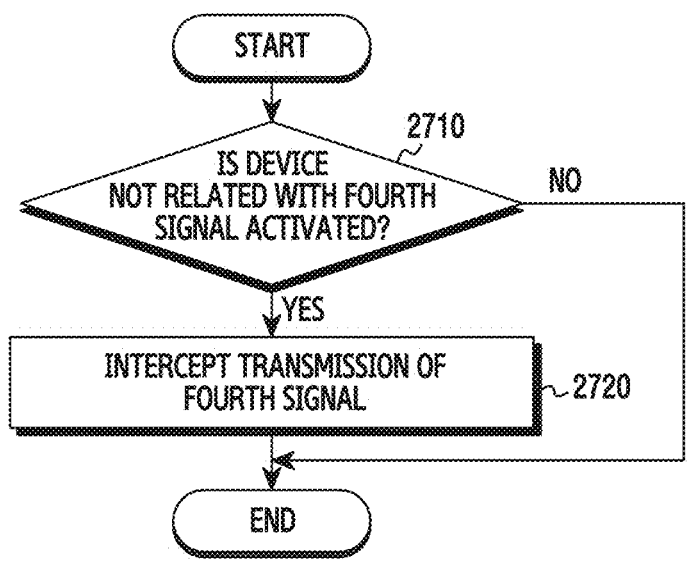
FIG. 27 is a flowchart illustrating an operation of an apparatus sensing hacking of an application region according to various embodiments.

FIG. 27 is a flowchart illustrating an operation of an apparatus sensing hacking of an application region according to various embodiments. This operation flow may be performed by the security device 510 illustrated in FIG. 5.

Referring to FIG. 27, in step 2710, the security device 510 may detect whether a fourth signal activates a device not related. The fourth signal may be a signal generated by a system call of an application. The fourth signal may be a signal for activating the peripheral device 520 illustrated in FIG. 5. The security device 510 may detect whether the fourth signal activates a device not related, based on data included in the fourth signal and an application corresponding to the fourth signal. If the fourth signal activates a power device within the electronic device 500, the communication interface 230, etc. although the application corresponding to the fourth signal is a camera (for example, the sensing device 240) application, the security device 510 may detect that the fourth signal activates the device not related.

Unlike this, if the fourth signal activates devices related, the security device 510 may identify that data related with hacking has not been included in the fourth signal.

If the fourth signal activates the device not related, in step 2720, the security device 510 may intercept the transmission of the fourth signal. The security device 510 may translate an address included in the fourth signal, to intercept the transmission of the fourth signal. Through operation of step 2720, the security device 510 may prevent a signal related with hacking from being spread within the electronic device 500.

Figure 28:
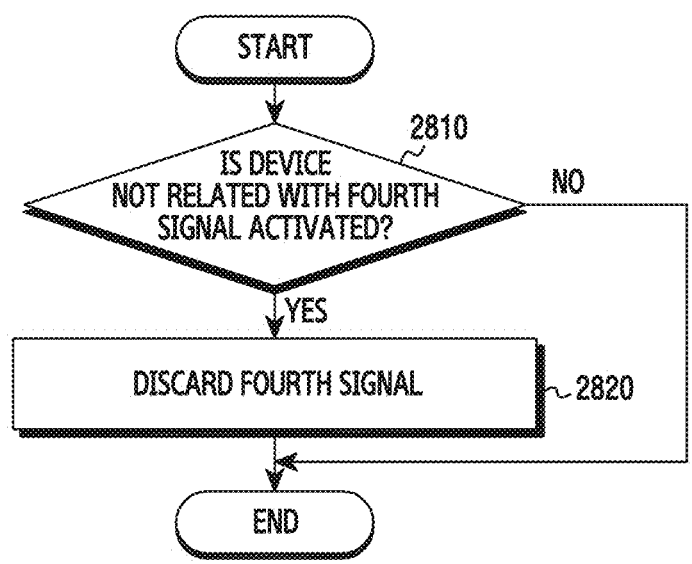
FIG. 28 is a flowchart illustrating another operation of an apparatus sensing hacking of an application region according to various embodiments.

FIG. 28 is a flowchart illustrating another operation of an apparatus sensing hacking of an application region according to various embodiments. This operation flow may be performed by the security device 510 illustrated in FIG. 5.

Referring to FIG. 28, operation of step 2810 may correspond to operation of step 2710 illustrated in FIG. 27.

In step 2820, the security device 510 may discard the fourth signal. In response to it being identified that the fourth signal is a signal related with hacking, the security device 510 may discard the fourth signal, in order to maintain a security of the electronic device 500.

Figure 29:
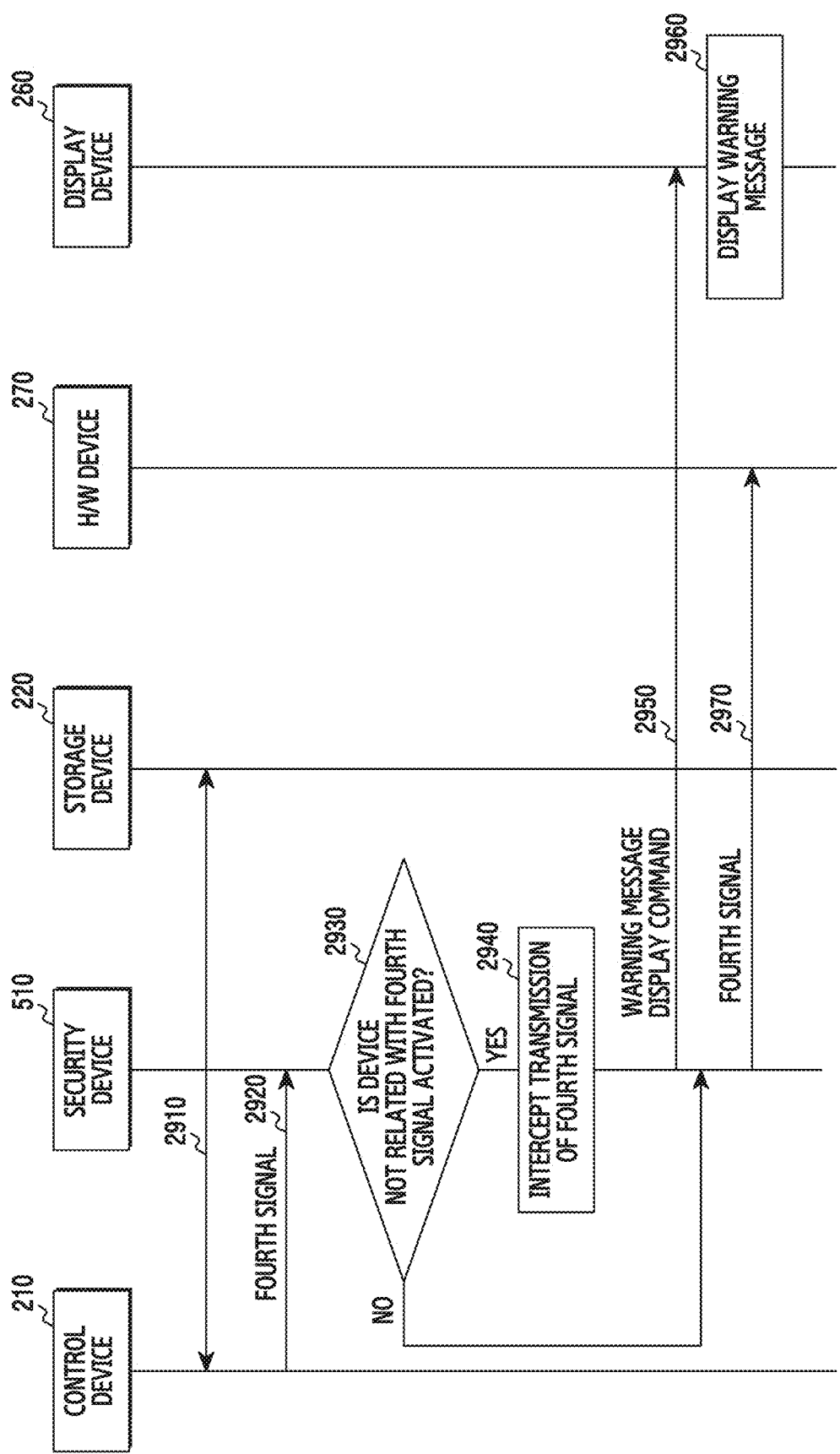
FIG. 29 illustrates a signal flow of an electronic device sensing hacking of an application region according to various embodiments.

FIG. 29 illustrates a signal flow of an electronic device sensing hacking of an application region according to various embodiments. This signal flow may be provided in the electronic device 500 illustrated in FIG. 5.

Referring to FIG. 29, in step 2910, the control device 210 may communicate with the storage device 220. The control device 210 and the storage device 220 may communicate for the sake of execution of an application installed in the electronic device 500. The control device 210 and the storage device 220 may communicate in order to control constituent elements included in the electronic device 500.

In step 2920, the control device 210 may transmit the fourth signal to the security device 510. The fourth signal may be a signal that will be forwarded to the peripheral device 520. The fourth signal may be a signal for controlling the peripheral device 520.

Operation of step 2920 exemplifies a case where the control device 210 transmits the fourth signal to the peripheral device 520, but may be identically applied even to a case where the peripheral device 520 transmits the fourth signal to the control device 210. The security device 510 may receive the fourth signal from the control device 210.

In step 2930, the security device 510 may detect whether the fourth signal activates a device not related with the fourth signal. For example, if the control device 210 transmits the fourth signal to the sensing device 240 correspondingly to execution of a chatting app not having a camera function, the security device 510 may identify that the fourth signal is a signal related with hacking. Unlike this, if the control device 210 transmits the fourth signal to the input output device 250 correspondingly to the execution of the chatting app not having the camera function, the security device 510 may identify that the fourth signal is a signal not related with hacking.

If the fourth signal activates a device related with the fourth signal, in step 2970, the security device 510 may transmit the fourth signal to the peripheral device 520.

If the fourth signal activate a device not related with the fourth signal, in step 2940, the security device 510 may intercept the transmission of the fourth signal. The security device 510 may translate an address included in the fourth signal, to intercept the transmission of the fourth signal.

In step 2950, the security device 510 may transmit a warning message display command to the display device 260. The display device 260 may receive the warning message display command from the security device 510.

In step 2960, the display device 260 may display a warning message. Through the displaying of the warning message, a user of the electronic device 500 may recognize that a hacking attack has been sensed within the electronic device 500. Through the displaying of the warning message, the user of the electronic device 500 may recognize that a specific signal has been intercepted within the electronic device 500. The specific signal may be a signal related with hacking.

Through operations of step 2910 to step 2960, the security device 510 according to various embodiments may maintain a security of the electronic device 500. The security device 510 may sense a hacking attack on an application region of the electronic device 500. The security device 510 may real-time cope with the hacking attack on the application region of the electronic device 500.

A method for operating an apparatus according to various embodiments described above may include detecting whether a first signal transmitted from a control device to a storage device includes a designated address, and transmitting a second signal to the control device if the first signal includes the designated address. The first signal may be a signal for transmitting, by the control device, a request for data to the storage device. The second signal may be a signal for detecting whether uncommon data is included in a signal generated from the first signal. The method for operating the apparatus may further include displaying, on a display device, a warning message including information about the first signal, if the first signal includes the designated address.

Also, the method for operating the apparatus may further include detecting whether a third signal transmitted from the control device to the storage device includes an address of an immutable region, and if the third signal includes the address of the immutable region, translating an address of the third signal, to intercept transmission to the storage device. The third signal may include data for recording, by the control device, in the storage device. The method for operating the apparatus may further include displaying, on a display device, a warning message including information about the third signal, if the third signal includes the address of the immutable region. Also, the method for operating the apparatus may discard the third signal if the third signal includes the address of the immutable region.

Also, the method for operating the apparatus may further include recording data of the third signal, based on an address included in the third signal transmitted from the control device to the storage device, and detecting whether the recorded data is updated, and if the recorded data is updated, detecting whether a structure of the data is changed after the third signal is stored in the storage device, and if the structure of the data is changed, detecting the changed data or a signal related with the changed data, and discarding the changed data or a signal related with the change data. The third signal may include data for recording, by the control device, in the storage device. Also, the method for operating the apparatus may further include, if the changed data or the signal related with the changed data is detected, displaying a warning message on the display device.

Also, the method for operating the apparatus may further include detecting whether a fourth signal between the control device and another device includes data for activating a device not related with the fourth signal, and if the fourth signal includes the data for activating the device not related with the fourth signal, intercepting transmission of the fourth signal. The method for operating the apparatus may discard the fourth signal if the fourth signal includes the data for activating the device not related with the fourth signal.

Methods according to embodiments mentioned in claims or specification of the disclosure may be implemented in the form of hardware, software, or a combination of the hardware and the software.

In response to being implemented by software, a computer-readable storage medium storing one or more programs (i.e., software modules) may be provided. The one or more programs stored in the computer-readable storage medium are configured to be executable by one or more processors within an electronic device. The one or more programs include instructions for enabling the electronic device to execute the methods of the embodiments stated in the claims or specification of the disclosure.

This program (i.e., a software module and software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or an optical storage device of another form, and a magnetic cassette. Or, it may be stored in a memory that is constructed in combination of some or all of them. Also, each constructed memory may be included in plural as well.

Also, the program may be stored in an attachable storage device that may access through a communication network such as the Internet, an intranet, a local area network (LAN), a wireless LAN (WLAN) or a storage area network (SAN), or a communication network configured in combination of them. This storage device may connect to a device performing an embodiment of the disclosure through an external port. Also, a separate storage device on the communication network may connect to the device performing the embodiment of the disclosure as well.

In the aforementioned concrete embodiments of the disclosure, constituent elements included in the disclosure have been expressed in the singular form or plural form according to a proposed concrete embodiment. But, the expression of the singular form or plural form is selected suitable to a given situation for the sake of description convenience, and the disclosure is not limited to singular or plural constituent elements. Even a constituent element expressed in the plural form may be constructed in the singular form, or even a constituent element expressed in the singular form may be constructed in the plural form.

While the detailed description of the disclosure describes a concrete embodiment, it is undoubted that various modifications are available without departing from the scope of the disclosure. Therefore, the scope of the disclosure should not be defined by a limitation to the explained embodiment and should be defined by not only the scope of claims mentioned below but also equivalents to the scope of these claims.

What is claimed is:

1. A method for operating an apparatus, the method comprising:
   detecting whether a first signal transmitted from a control device to a storage device comprises a designated address, wherein the first signal is a signal for transmitting, by the control device, a request for data to the storage device; and
   transmitting a second signal to the control device if the first signal comprising the designated address wherein the second signal is a signal for detecting whether a signal generated from the first signal comprises uncommon data including financial information;
   recording a data of a third signal, based on an address comprised in the third signal transmitted from the control device to the storage device;
   when the data of the third signal is updated after the data of the third signal is stored in the storage device, detecting a partial data which is included in the updated data but not included in the stored data as a data related hacking;
   detecting whether the third signal transmitted from the control device to the storage device comprises an address of an immutable region; and
   if the third signal comprises the address of the immutable region, translating an address of the third signal, to intercept transmission to the storage device.

2. The method of claim 1, further comprising displaying, on a display device, a warning message comprising information about the first signal if the first signal comprises the designated address.

3. The method of claim 1, further comprising displaying, on a display device, a warning message comprising information about the third signal if the third signal comprises the address of the immutable region.

4. The method of claim 1, further comprising: discarding the partial data or a signal related with the partial data.

5. The method of claim 4, further comprising, if the partial data or the signal related with the partial data is detected, displaying a warning message on the display device.

6. The method of claim 1, further comprising: detecting whether a fourth signal between the control device and another device comprises data for activating a device not related with the fourth signal; and if the fourth signal comprises the data for activating the device not related with the fourth signal, intercepting transmission of the fourth signal.

7. An apparatus comprising:
   a transceiver; and
   at least one processor operatively coupled with the transceiver,
   wherein the at least one processor is configured to:
      detect whether a first signal transmitted from a control device to a storage device comprises a designated address, wherein the first signal is a signal for transmitting, by the control device, a request for data to the storage device,
      transmit a second signal to the control device if the first signal comprises the designated address, wherein the second signal is a signal for detecting whether a signal generated from the first signal comprises uncommon data including financial information,
      record a data of a third signal, based on an address comprised in the third signal transmitted from the control device to the storage device,
      when the data of the third signal is updated after the data of the third signal is stored in the storage device, detect a partial data which is included in the updated data but not included in the stored data as a data related hacking,
      detect whether the third signal transmitted from the control device to the storage device comprises an address of an immutable region, and
      translate an address of the third signal and intercept transmission to the storage device if the third signal comprises the address of the immutable region.

8. The apparatus of claim 7, wherein the at least one processor is further configured to display, on the display device, a warning message comprising information about the first signal if the first signal comprises the designated address.

9. The apparatus of claim 7, wherein the at least one processor is further configured to display, on the display device, a warning message comprising information about the third signal if the third signal comprises the address of the immutable region.

10. The apparatus of claim 7, wherein the at least one processor is further configured to: discard the partial data or a signal related with the partial data.

11. The apparatus of claim 10, wherein the at least one processor is further configured to, if the partial data or the signal related with the partial data is detected, display a warning message on the display device.

12. The apparatus of claim 7, wherein the at least one processor is further configured to: detect whether a fourth signal between the control device and another device comprises data for activating a device not related with the fourth signal, and intercept transmission of the fourth signal if the fourth signal comprises the data for activating the device not related with the fourth signal.

13. The method of claim 1, wherein the apparatus discards the third message if the third signal comprises the address of the immutable region.

14. The method of claim 4, wherein the apparatus discards data related with the updating if the data related with the updating activates an operation not designated.

15. The method of claim 6, wherein the apparatus discards the fourth message if the fourth signal comprises the data for activating the device not related with the fourth signal.

16. The apparatus of claim 7, wherein the at least one processor is further configured to discard the third message if the third signal comprises the address of the immutable region.

17. The apparatus of claim 11, wherein the at least one processor is further configured to discard data related with the updating if the data related with the updating activates an operation not designated.

18. The apparatus of claim 12, wherein the at least one processor is further configured to discard the fourth message if the fourth signal comprises the data for activating the device not related with the fourth signal.

\* \* \* \* \*